(12) United States Patent
Schliwa-Bertling et al.

(10) Patent No.: US 12,470,928 B2
(45) Date of Patent: Nov. 11, 2025

(54) PROTECTING CAPABILITY INFORMATION TRANSFER IN A WIRELESS COMMUNICATION NETWORK

(71) Applicant: Telefonaktiebolaget LM Ericsson (publ), Stockholm (SE)

(72) Inventors: Paul Schliwa-Bertling, Ljungsbro (SE); Prajwol Kumar Nakarmi, Sollentuna (SE); Christofer Lindheimer, Vadstena (SE); Helena Vahidi Mazinani, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 220 days.

(21) Appl. No.: 17/799,455

(22) PCT Filed: Feb. 12, 2021

(86) PCT No.: PCT/EP2021/053452
§ 371 (c)(1),
(2) Date: Aug. 12, 2022

(87) PCT Pub. No.: WO2021/160800
PCT Pub. Date: Aug. 19, 2021

(65) Prior Publication Data
US 2023/0188992 A1 Jun. 15, 2023

Related U.S. Application Data

(60) Provisional application No. 62/976,897, filed on Feb. 14, 2020.

(51) Int. Cl.
*H04L 9/40* (2022.01)
*G06F 21/10* (2013.01)
(Continued)

(52) U.S. Cl.
CPC ............ *H04W 12/08* (2013.01); *G06F 21/10* (2013.01); *H04L 63/0807* (2013.01); *H04W 12/037* (2021.01)

(58) Field of Classification Search
CPC ... H04W 12/10; H04W 12/08; H04W 12/037; H04L 63/04; H04L 63/0807; G06F 21/60; G06F 21/10
See application file for complete search history.

(56) References Cited

U.S. PATENT DOCUMENTS 10,841,084 B2 * 11/2020 Lee .................. H04L 63/102
11,589,235 B2 * 2/2023 Ohlsson ............. H04W 12/108
(Continued)

FOREIGN PATENT DOCUMENTS

WO 2018083151 A1 5/2018

OTHER PUBLICATIONS

3GPP, "3GPP TR 23.743 V16.0.0", 3rd Generation Partnership Project; Technical Specification Group Services and System Aspects; Study on optimisations on UE radio capability signalling (Release 16), Mar. 2019, 1-56.
(Continued)

*Primary Examiner* — Mohammad A Siddiqi
(74) *Attorney, Agent, or Firm* — Weisberg I.P. Law, P.A.

(57) ABSTRACT

A wireless device (14) receives, over an access stratum (18), a capability enquiry (24) that requests the wireless device (14) to transmit capability information (22) indicating one or more capabilities of the wireless device (14). After receiving the capability enquiry (24), the wireless device (14) generates a token (26) using one or more input parameters (28) and transmits the token (26). The one or more input parameters (28) include at least some part of the capability enquiry (24) and/or at least some of the capability information (22). In some embodiments, the token (26) is generated or trans-
(Continued)

mitted based on a non-access stratum security context (30) at the wireless device (14). The wireless device (14) also transmits the capability information (22) over the access stratum (18).

12 Claims, 32 Drawing Sheets

(51) Int. Cl.
*H04W 12/037* (2021.01)
*H04W 12/08* (2021.01)

(56) References Cited

U.S. PATENT DOCUMENTS

| | | | | |
|---|---|---|---|---|
| 11,617,077 | B2* | 3/2023 | Kolekar | H04W 8/24 |
| | | | | 713/181 |
| 11,800,522 | B2* | 10/2023 | Jassal | H04L 1/1671 |
| 11,962,999 | B2* | 4/2024 | Baskaran | H04W 12/0431 |
| 2009/0111428 | A1* | 4/2009 | Blommaert | H04W 12/041 |
| | | | | 455/445 |
| 2017/0187691 | A1* | 6/2017 | Lee | H04L 63/0428 |
| 2018/0007552 | A1* | 1/2018 | Bae | H04L 63/083 |
| 2018/0249479 | A1* | 8/2018 | Cho | H04W 12/086 |
| 2019/0320318 | A1* | 10/2019 | Lehtovirta | H04L 63/205 |
| 2019/0357109 | A1* | 11/2019 | Hong | H04W 76/27 |
| 2019/0363843 | A1 | 11/2019 | Gordaychik | |
| 2019/0387404 | A1 | 12/2019 | Chen et al. | |
| 2020/0028817 | A1* | 1/2020 | Ramakrishnan | H04L 51/02 |
| 2020/0092727 | A1* | 3/2020 | Basu Mallick | H04W 8/22 |
| 2020/0128398 | A1* | 4/2020 | Wifvesson | H04W 12/10 |
| 2020/0396598 | A1* | 12/2020 | Guo | H04W 12/08 |
| 2021/0021994 | A1* | 1/2021 | Kolekar | H04W 8/24 |
| 2022/0007176 | A1* | 1/2022 | Lindheimer | H04L 9/3239 |
| 2022/0007182 | A1* | 1/2022 | Stojanovski | H04W 12/037 |
| 2022/0014920 | A1* | 1/2022 | Pham Van | H04W 4/20 |
| 2022/0303935 | A1* | 9/2022 | Olsson | H04W 40/34 |
| 2022/0394476 | A1* | 12/2022 | Da Silva | H04W 76/27 |
| 2024/0357350 | A1* | 10/2024 | Liu | H04W 12/02 |

OTHER PUBLICATIONS

3GPP, "3GPP TR 33.861 V1.5.0", 3rd Generation Partnership Project; Technical Specification Group Services and System Aspects; Study on evolution of Cellular IoT security for the 5G System; (Release 16), Nov. 2019, 1-72.

3GPP, "3GPP TS 23.401 V16.5.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Dec. 2019, 1-436.

3GPP, "3GPP TS 33.401 V16.1.0", 3rd Generation Partnership Project; Technical Specification Group Services and System Aspects; 3GPP System Architecture Evolution (SAE); Security architecture (Release 16), Dec. 2019, 1-165.

3GPP, "3GPP TS 33.501 V15.6.0", 3rd Generation Partnership Project; Technical Specification Group Services and System Aspects; Security architecture and procedures for 5G system (Release 15), Sep. 2019, 1-190.

3GPP, "3GPP TS 33.501 V16.1.0", 3rd Generation Partnership Project; Technical Specification Group Services and System Aspects; Security architecture and procedures for 5G system (Release 16), Dec. 2019, 1-202.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.8.0, Dec. 2019, 1-317.

3GPP, "3rd Generation Partnership Project; Technical Specification Group Radio Access Network; NR; NR and NG-Ran Overall Description; Stage 2 (Release 15)", 3GPP TS 38.300 V15.0.0, Dec. 2017, 1-68.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, 1-558.

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 1-417.

* cited by examiner

PROTECTING CAPABILITY INFORMATION TRANSFER IN A WIRELESS COMMUNICATION NETWORK

RELATED APPLICATIONS

The present application claims the benefit of U.S. provisional application Ser. No. 62/976,897, filed 14 Feb. 2020, the entire contents of which is incorporated herein by reference.

TECHNICAL FIELD

The present application relates generally to a wireless communication network, and relates more particularly to protecting capability information transfer in such a network.

BACKGROUND

A wireless device informs a wireless communication network of the device's capabilities upon attaching to the network and/or at other times, so that the device and network can communicate using parameters within the device's capability. The device's capabilities can be classified into two categories depending on which layer of the protocol hierarchy the capabilities are related to. The access stratum (AS) level capabilities are access technology dependent parts of the capability information, such as device power class and supported frequency bands. The AS capabilities are used by the radio access network. The AS capabilities may therefore also be appropriately referred to as radio access capabilities. The non-access stratum (NAS) level capabilities are the capabilities which are not access related, such as supported security algorithms. The NAS capabilities are used by the core network.

Some known approaches for the wireless device to provide capability information to the network protect communication of the capability information over the AS, to guard against security and/or privacy threats. These known approaches, however, rely on security to be activated on the AS at some point, either before or after the transmission of the capability information over the AS. These known approaches to protecting capability information transfer therefore prove inadequate when AS security is not activated or supported. For example, some wireless devices may lack support for AS security, which would leave the capability information for those wireless devices vulnerable to tampering by an attacker.

Other known approaches, such as those described in 3GPP TR 33.861 v1.5.0, only protect static capability information, are demanding on wireless device battery consumption, and/or delay capability information fetching so as to jeopardize early optimizations in the radio access network.

SUMMARY

Some embodiments herein protect the transfer of capability information from a wireless device to a network by exploiting non-access stratum (NAS) level security and/or multiple protocol layers, e.g., even without reliance on access stratum (AS) level security. Some embodiments moreover protect the transfer of this capability information in a way that accounts for the wireless device adaptively providing different capability information to the network depending on what capability information the network requests, i.e., so-called future proofness herein. Alternatively or additionally, some embodiments herein protect the transfer of capability information in a way that binds the capability information request with the capability information response, so as to ensure the network that the provided capability information actually corresponds to what the network requested.

More particularly, some embodiments herein include a method performed by a wireless device. The method comprises receiving, over an access stratum, a capability enquiry that requests the wireless device to transmit capability information indicating one or more capabilities of the wireless device. The method also comprises, after receiving the capability enquiry, generating a token using one or more input parameters and transmitting the token. In some embodiments, the one or more input parameters include at least some part of the capability enquiry. Additionally or alternatively, in some embodiments, the one or more input parameters include at least some of the capability information. Regardless, in some embodiments, the token is generated or transmitted based on a non-access stratum security context at the wireless device. The method also comprises, after receiving the capability enquiry, transmitting the capability information over the access stratum.

In some embodiments, the one or more input parameters include at least some part of the capability enquiry.

In some embodiments, the one or more input parameters include at least some of the capability information.

In some embodiments, the one or more input parameters include a key that is in or derived from the non-access stratum security context. Additionally or alternatively, the one or more input parameters include a count value included in the non-access stratum security context.

In some embodiments, generating the token comprises calculating the token as a hash, or as a keyed hash, over the at least some of the capability information.

In some embodiments, the capability enquiry is received over the access stratum without access stratum security. Additionally or alternatively, the capability information is transmitted over the access stratum without access stratum security.

In some embodiments, transmitting the capability information comprises transmitting a response to the capability enquiry. In some embodiments, the response includes the capability information and the token.

In some embodiments, transmitting the token comprises transmitting the token to radio network equipment over the access stratum.

In some embodiments, transmitting the token comprises transmitting the token to core network equipment in a non-access stratum message.

In some embodiments, the capability information comprises access stratum capability information or radio capability information.

In some embodiments, the wireless device lacks support for access stratum security. Additionally or alternatively, the wireless device only supports control plane cellular internet of things optimization functionality.

Other embodiments herein include a method performed by network equipment. The method comprises receiving, from radio network equipment, at least some part of a capability enquiry that the radio network equipment has sent to a wireless device to request the wireless device to transmit capability information indicating one or more capabilities of the wireless device. Alternatively or additionally, the method comprises receiving, from the radio network equipment, at least some of the capability information that the radio network equipment has received from the wireless device in response to the capability enquiry. Regardless, the method further comprises generating, by the network equipment, a token using one or more input parameters. In some embodiments, the one or more input parameters include the at least some part of the capability enquiry. Additionally or alternatively, the one or more input parameters include the at least some of the capability information received from the radio network equipment. The method further comprises performing, or assisting the radio network equipment with, verification of whether the token that the network equipment generated matches or corresponds to a token that the wireless device generated (e.g., a token that the wireless device generated after the wireless device received the capability enquiry).

In some embodiments, the method further comprises after the network equipment receives the capability information from the wireless device, receiving the token that the wireless device generated. In one or more of these embodiments, receiving the token that the wireless device generated comprises receiving, from the radio network equipment, the token that the wireless device generated. In one or more of these embodiments, receiving the token that the wireless device generated comprises receiving, from the wireless device, the token that the wireless device generated. In one or more of these embodiments, the token that the wireless device generated is received in a non-access stratum message. In one or more of these embodiments, the token that the wireless device generated is received over a non-access stratum after activation of security on the non-access stratum.

In some embodiments, generating the token by the network equipment comprises generating the token by the network equipment based on a non-access stratum security context at the network equipment.

In some embodiments, the one or more input parameters include a key that is in or derived from the non-access stratum security context. Additionally or alternatively, the one or more input parameters include a count value included in the non-access stratum security context.

In some embodiments, generating the token comprises calculating the token as a hash, or as a keyed hash, over the at least some of the capability information.

In some embodiments, the one or more input parameters include at least some of the capability information.

In some embodiments, the one or more input parameters include at least some part of the capability enquiry.

In some embodiments, the capability information comprises access stratum capability information or radio capability information.

In some embodiments, the wireless device lacks support for access stratum security. Additionally or alternatively, the wireless device only supports control plane cellular internet of things optimization functionality.

In some embodiments, the method further comprises assisting the radio network equipment with the verification. In some embodiments, assisting the radio network equipment comprises transmitting the token generated by the network equipment to the radio network equipment.

Other embodiments herein include a method performed by radio network equipment. The method comprises transmitting to a wireless device, over an access stratum, a capability enquiry that requests the wireless device to transmit capability information indicating one or more capabilities of the wireless device. The method also comprises transmitting, to network equipment, at least some part of the capability enquiry.

In some embodiments, the method further comprises, after transmitting the capability enquiry, receiving the capability information from the wireless device over the access stratum. In one or more such embodiments, the method may also comprise transmitting, to the network equipment, at least some of the received capability information.

In some embodiments, the method further comprises receiving, from the network equipment, a notification indicating whether the network equipment verifies the capability enquiry and/or the capability information as being securely communicated. Additionally or alternatively, the notification indicates whether, or that, a token generated by the network equipment matches or corresponds to a token generated by the wireless device.

In some embodiments, the capability information comprises access stratum capability information or radio capability information.

In some embodiments, the wireless device lacks support for access stratum security. Additionally or alternatively, the wireless device only supports control plane cellular internet of things optimization functionality.

In some embodiments, the method further comprises, after transmitting the capability enquiry to the wireless device, receiving a token from the wireless device and transmitting the received token to the network equipment.

Other embodiments herein include a wireless device comprising communication circuitry and processing circuitry. The processing circuitry is configured to receive, over an access stratum, a capability enquiry that requests the wireless device to transmit capability information indicating one or more capabilities of the wireless device. The processing circuitry is also configured to, after receiving the capability enquiry, generate a token using one or more input parameters and transmit the token. In some embodiments, the one or more input parameters include at least some part of the capability enquiry. Additionally or alternatively, the one or more input parameters include at least some of the capability information. In some embodiments, the token is generated or transmitted based on a non-access stratum security context at the wireless device. The processing circuitry is also configured to, after receiving the capability enquiry, transmit the capability information over the access stratum.

In some embodiments, the processing circuitry is configured to perform the steps described above for a wireless device.

Other embodiments herein include network equipment comprising communication circuitry and processing circuitry. The processing circuitry is configured to receive, from radio network equipment, (i) at least some part of a capability enquiry that the radio network equipment has sent to a wireless device to request the wireless device to transmit capability information indicating one or more capabilities of the wireless device and/or (ii) at least some of the capability information that the radio network equipment has received from the wireless device in response to the capability enquiry. The processing circuitry is also configured to generate, by the network equipment, a token using one or more input parameters. In some embodiments, the one or more input parameters include the at least some part of the capability enquiry. Additionally or alternatively, the one or more input parameters include the at least some of the capability information received from the radio network equipment. The processing circuitry is also configured to perform, or assist the radio network equipment with, verification of whether the token that the network equipment generated matches or corresponds to a token that the wireless device generated (e.g., a token that the wireless device generated after the wireless device received the capability enquiry).

In some embodiments, the processing circuitry is configured to perform the steps described above for network equipment.

Other embodiments herein include radio network equipment comprising communication circuitry and processing circuitry. The processing circuitry is configured to transmit to a wireless device, over an access stratum, a capability enquiry that requests the wireless device to transmit capability information indicating one or more capabilities of the wireless device, and after transmitting the capability enquiry, receive the capability information from the wireless device over the access stratum. The processing circuitry is also configured to transmit, to network equipment, at least some of the received capability information and/or at least some part of the capability enquiry.

In some embodiments, the processing circuitry is configured to perform the steps described above for radio network equipment.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of network equipment, causes the network equipment to perform the steps described above for network equipment. Other embodiments herein include a computer program comprising instructions which, when executed by at least one processor of radio network equipment, causes the radio network equipment to perform the steps described above for radio network equipment. In one or more of these embodiments, a carrier containing the computer program described above is one of an electronic signal, optical signal, radio signal, or computer readable storage medium.

Other embodiments herein include a method performed by a wireless device. The method comprises receiving a request at a first protocol layer of the wireless device. In some embodiments, the request is a capability enquiry that requests the wireless device to transmit capability information indicating one or more capabilities of the wireless device. The method also comprises transmitting, from a second protocol layer of the wireless device, a response to the request. In some embodiments, the response includes the capability information.

In some embodiments, the request is received at the first protocol layer without security on the first protocol layer. In this case, the response is transmitted from the second protocol layer with security on the second protocol layer.

In some embodiments, transmitting the response comprises generating a first protocol layer message, encapsulating the first protocol layer message in the response, and transmitting the response from the second protocol layer.

In some embodiments, the wireless device lacks support for security at the first protocol layer. Additionally or alternatively, the wireless device only supports control plane cellular internet of things optimization functionality.

In some embodiments, the first protocol layer is, corresponds to, or is included in an access stratum. Additionally or alternatively, the second protocol layer is, corresponds to, or is included in a non-access stratum.

In some embodiments, the capability information comprises access stratum capability information or radio capability information.

Other embodiments herein include a method performed by radio network equipment. The method comprises transmitting a request to a wireless device. In some embodiments, the request is a capability enquiry that requests the wireless device to transmit capability information indicating one or more capabilities of the wireless device. The method further comprises receiving, from network equipment, a response from the wireless device to the request. In some embodiments, the response includes the capability information.

In some embodiments, the request is transmitted from a first protocol layer of the radio network equipment without security on the first protocol layer. In some embodiments, the response is received from the network equipment on a protected interface with the network equipment.

In some embodiments, the request is transmitted on an access stratum.

In some embodiments, the wireless device lacks support for security on an access stratum. Additionally or alternatively, the wireless device only supports control plane cellular internet of things optimization functionality.

In some embodiments, the capability information comprises access stratum capability information or radio capability information.

Other embodiments herein include a method performed by a network equipment. The method comprises receiving, from a wireless device, a response to a request that a radio network equipment transmitted to the wireless device. In some embodiments, the request is a capability enquiry that requests the wireless device to transmit capability information indicating one or more capabilities of the wireless device. The method also comprises transmitting the response to the radio network equipment. In this case, the response includes the capability information.

In some embodiments, the request is transmitted from a first protocol layer of the radio network equipment to the wireless device without security on the first protocol layer. In some embodiments, the response is transmitted from the network equipment on a protected interface with the radio network equipment.

In some embodiments, the request is transmitted from the radio network equipment to the wireless device on an access stratum.

In some embodiments, the wireless device lacks support for security on an access stratum. Additionally or alternatively, the wireless device only supports control plane cellular internet of things optimization functionality.

In some embodiments, the capability information comprises access stratum capability information or radio capability information.

Other embodiments herein include a wireless device comprising communication circuitry and processing circuitry. The processing circuitry is configured to receive a request at a first protocol layer of the wireless device. In some embodiments, the request is a capability enquiry that requests the wireless device to transmit capability information indicating one or more capabilities of the wireless device. The processing circuitry is also configured to transmit, from a second protocol layer of the wireless device, a response to the request. In some embodiments, the response includes the capability information.

In some embodiments, the processing circuitry is configured to perform the steps described above for a wireless device.

Other embodiments herein include radio network equipment comprising communication circuitry and processing circuitry. The processing circuitry is configured to transmit a request to a wireless device. In some embodiments, the request is a capability enquiry that requests the wireless device to transmit capability information indicating one or more capabilities of the wireless device. The processing circuitry is also configured to receive, from network equipment, a response from the wireless device to the request, wherein the response includes the capability information.

In some embodiments, the processing circuitry is configured to perform the steps described above for radio network equipment.

Other embodiments herein include network equipment comprising communication circuitry and processing circuitry. The processing circuitry is configured to receive, from a wireless device, a response to a request that a radio network equipment transmitted to the wireless device. In some embodiments, the request is a capability enquiry that requests the wireless device to transmit capability information indicating one or more capabilities of the wireless device. The processing circuitry is also configured to transmit the response to the radio network equipment, wherein the response includes the capability information.

In some embodiments, the processing circuitry is configured to perform the steps described above for network equipment.

Other embodiments herein include a computer program comprising instructions which, when executed by at least one processor of a wireless device, causes the wireless device to perform the steps described above for a wireless device. Other embodiments herein include a computer program comprising instructions which, when executed by at least one processor of radio network equipment, causes the network equipment to perform the steps described above for radio network equipment. Other embodiments herein include a computer program comprising instructions which, when executed by at least one processor of network equipment, causes the network equipment to perform the steps described above for network equipment. In one or more of these embodiments, a carrier containing the computer program described above is one of an electronic signal, optical signal, radio signal, or computer readable storage medium.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
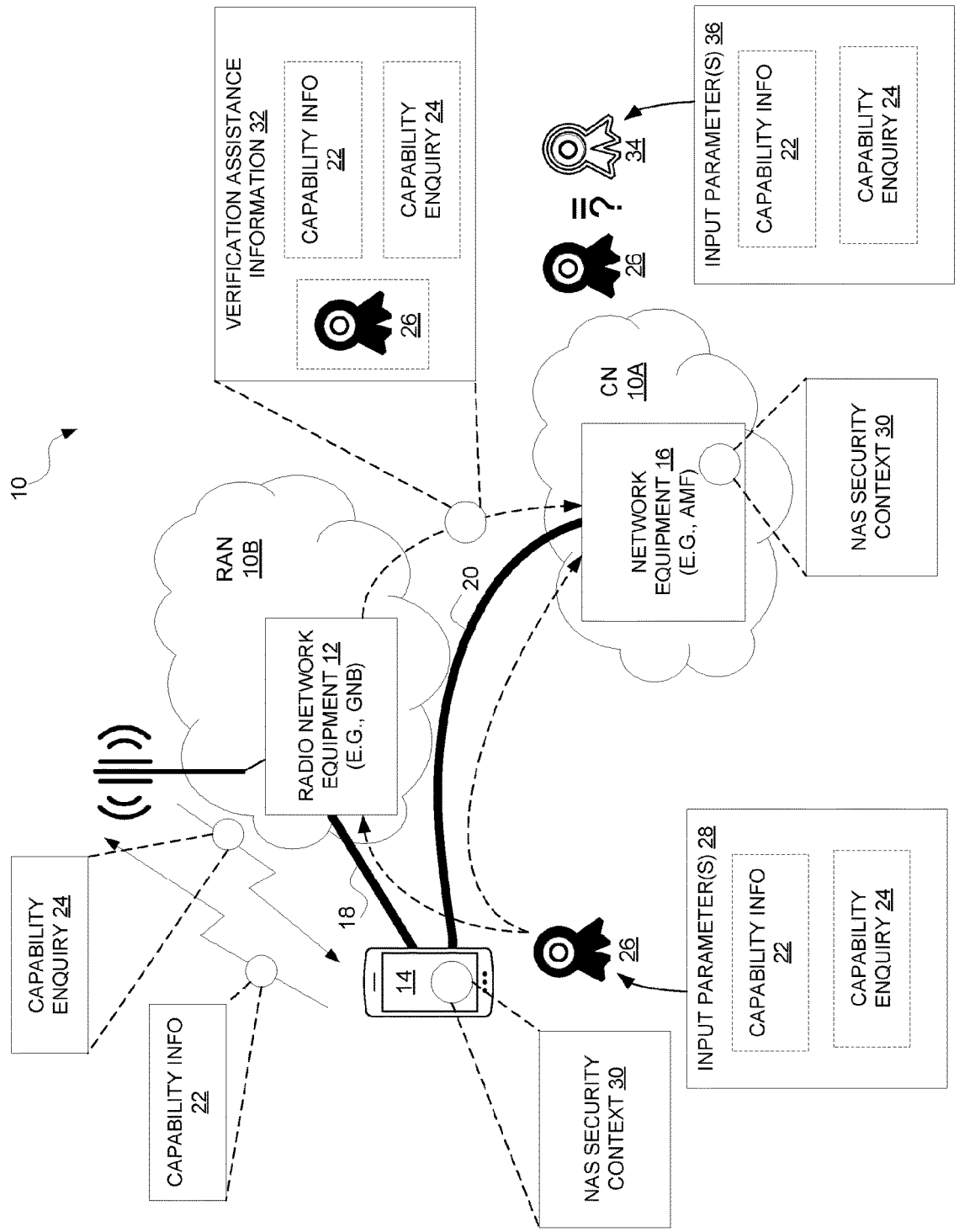
FIG. 1 is a block diagram of a wireless communication network according to some embodiments.

FIG. 1 shows a wireless communication network 10 (e.g., a 5G network) according to some embodiments. The network 10 includes a core network (CN) 10A and a radio access network (RAN) 10B. The RAN 10B includes radio network equipment 12 for providing radio access to wireless communication devices 14 (also referred to simply as wireless device), one of which is shown. Via this radio access, a wireless device 14 connects to the CN 10A, which in turn may provide the wireless device 14 with access to one or more external networks, such as the Internet. The CN 10A for example may include network equipment 16, which may for instance implement an access and mobility function (AMF).

From a protocol structure standpoint, the network 10 is divided into an access stratum (AS) 18 and a non-access stratum (NAS) 20. The AS 18 contains protocols that handle activities between the wireless device 14 and the RAN 10B, e.g., for transporting data over a radio connection and managing radio resources. The NAS 20 contains protocols that handle activities between the wireless device 14 and the CN 10A (or, more particularly, network equipment 16 within the CN 10A), e.g., for establishing communication sessions and maintaining continuous communications as the wireless device 14 moves. The network 10 is also divided into a user plane (UP) and a control plane (CP). The control plane contains protocols responsible for managing transport bearers, whereas the user plane contains protocols responsible for transporting user traffic.

FIG. 1 shows the wireless device 14 transmits so-called capability information 22 indicating one or more capabilities of the wireless device 14. The wireless device 14 may do so in response to the wireless device 14 receiving a capability enquiry 24 (e.g., from the radio network equipment 12) that requests the wireless device 14 to transmit the capability information 22. The capability information 22 in some embodiments constitutes radio access capability information, which is any type of information that indicates radio access capabilities of the wireless device 14. The information 22 may for instance indicate those capabilities explicitly using explicit parameter values, using multiple segments of capabilities information, using a (manufacturer-specific) identifier (e.g., capability ID) that encodes or maps to a set of capabilities, using compressed information, or the like. No matter the particular way the capabilities are indicated, the radio access capabilities of the wireless device 14 as used herein refer to the capabilities of the wireless device for communicating over the radio access with the RAN 10B. These radio access capabilities may also be referred to as AS capabilities. The radio access capabilities are therefore distinguished from the capabilities of the wireless device 14 with respect to communication with the CN 10A and/or over the NAS.

In any event, radio access capabilities as indicated by the capability information 22 may include, for example, frequency bands supported by the wireless device 14, discontinuous reception cycle lengths supported by the wireless device 14, feature group indicator information indicating support for different types of measurement reports, etc. Alternatively or additionally, the radio access capabilities may include one or more of: support for delay budget reporting, support for RRC_inactive state, support for uplink (UL) transmission via either master cell group (MCG) path or secondary cell group (SCG) path for split signaling radio bearer (SRB), support for uplink (UL) transmission via both MCG path and SCG path for split data radio bearer (DRB), support for direct SRB between the serving network (SN) and the wireless device 14, support for Evolved Universal Terrestrial Radio Access (EUTRA) vehicle to everything (V2X), support for Internet Protocol (IP) Multimedia Subsystem (IMS) voice over New Radio (NR) Packet Data Convergence Protocol (PDCP) for MCG bearer in NR, support for various PDCP parameters/features (e.g., PDCP duplication, out of order delivery, max number of header compression context sessions), support for Radio Link Control (RLC) parameters/features (e.g., supported length(s) of RLC sequence number), Medium Access Control (MAC) parameters/features (e.g., support for long discontinuous reception cycle lengths, support for configured grant configurations per cell group, support for skipping of uplink transmission for an uplink grant), and physical layer parameters/features (e.g., supported frequency bands, supported band combinations, support for beam correspondence, support for extended cyclic prefix (CP), support for sounding reference signal (SRS) antenna port switching, supported frequency separation class, supported Physical Downlink Control Channel (PDCCH) search space monitoring occasions, supported Physical Downlink Shared Channel (PDSCH) mapping types, supported PDCCH blind decoding capabilities, supported PUCCH formats).

Regardless, in some embodiments, as shown in FIG. 1, the wireless device 14 transmits the capability information 22 to the radio network equipment 12 on or over the AS 18, e.g., via one or more Radio Resource Control (RRC) messages transmitted over-the-air. The wireless device 14 may do so even without having activated security over the AS 18, e.g., where activation of security over the AS 18 may refer to the taking into use of security keys for activating or applying integrity protection and/or confidentiality protection over the AS 18. In fact, the wireless device 14 in some embodiments may even lack support for activation of security over the AS 18. The wireless device 14 may for example only support control plane cellular internet of things optimization functionality. In these and other cases, then, the capability enquiry 24 and/or the capability information 22 may be communicated over the AS 18 without AS security being activated.

Some embodiments herein nonetheless protect the transfer of the capability information 22 from the wireless device 14 by exploiting NAS level security, e.g., even without reliance on AS level security. Some embodiments moreover protect the transfer of this capability information 22 in a way that accounts for the wireless device 14 adaptively providing different capability information depending on what capability information is requested, i.e., so-called future proofness herein. Alternatively or additionally, some embodiments herein protect the transfer of capability information 22 in a way that binds the capability enquiry 24 with the capability information 22 transmitted in response, so as to ensure the provided capability information 22 actually corresponds to what was requested.

More particularly in this regard, the wireless device 14 as shown generates a token 26, e.g., also referred to as a security token for securing the transfer of capability information 22. The wireless device 14 may generate this token 26 using one or more input parameters 28. As shown, the input parameter(s) 28 may include at least some of the capability information 22 that the wireless device 14 has or will transmit. Notably, then, the wireless device 14 in some embodiments generates the token only after having received the capability enquiry 24. Generating the token 26 in this way means the token 26 depends on or otherwise accounts for exactly what capability information 22 is requested and/or transmitted in response, e.g., so that the token 26 may differ or vary depending on what capability information 22 is transmitted and/or requested. The wireless device 14 may for example generate the token 26 by calculating the token 26 as a hash over at least some of the capability information 22. In these and other cases, the wireless device 14 may generate the token 26 using a cryptographic hash function, a key derivation function, an integrity algorithm, an encryption algorithm, or the like.

Alternatively or additionally, the input parameter(s) 28 may include at least a part of the capability enquiry 24. Generating the token 26 in this way means the token 26 depends on or otherwise accounts for the exact capability enquiry 24 sent to the wireless device 14, e.g., so as to bind the capability information 22 with a specific capability enquiry 24. The wireless device 14 may for example generate the token 26 by calculating the token 26 as a hash over at least a part of the capability enquiry 24.

The wireless device 14 in some embodiments exploits a NAS security context 30 for generating or transmitting the token 26. The wireless device 14 may for example generate or transmit the token 26 using at least some information that is in or derived from the NAS security context 30. This information in or derived from the NAS security context 30 may include for instance one or more keys, a count value, a freshness parameter, an integrity algorithm, an encryption algorithm, or the like.

In particular, where the wireless device 14 generates the token 26 using the NAS security context 30, the input parameter(s) 28 used to generate the token 26 may include at least some information that is in or derived from the NAS security context 30. In one embodiment, for example, the input parameter(s) 28 include a key that is in or derived from the NAS security context 30. The wireless device 14 may for instance calculate the token 26 as a keyed hash over at least some of the capability information 28 and/or at least a part of the capability enquiry 24, where the keyed hash is keyed by one or more keys from or derived from the NAS security context 30. Alternatively or additionally, the wireless device 14 may generate the token 26 based on an integrity algorithm or an encryption algorithm identified by the NAS security context 30.

In embodiments where the wireless device 14 generates the token 26 based on the NAS security context 30, the wireless device 14 may transmit the token 26 to the radio network equipment 12, e.g., over the AS 18. The wireless device 26 may for example include the token 26 in a response to the capability enquiry 24, along with or in association with the capability information 22. The radio network equipment 12 may then forward the token 26 to network equipment 16 (e.g., implementing an AMF).

By contrast, in other embodiments where the wireless device 14 transmits the token 26 based on the NAS security context 30, the wireless device 14 may transmit the token 26 to the network equipment 16, e.g., in a NAS message over the NAS connection between the wireless device 14 and the network equipment 16. Indeed, in this case, the NAS connection itself may be established based on the NAS security context 30.

In any event, the radio network equipment 12 as shown in some embodiments transmits verification assistance information 32 to the network equipment 16. The verification assistance information 32 may include the token 26 (e.g., if the radio network equipment 12 received the token 26 from the wireless device 14), at least some of the capability information 22 received from the wireless device 14, and/or at least a part of the capability enquiry 24.

As shown, the network equipment 16 itself generates a token 34 using one or more input parameters 36. The input parameter(s) 26 similarly may include at least some of the capability information 22 that the wireless device 14 has or will transmit and/or at least a part of the capability enquiry 24, e.g., as indicated in the verification assistance information 32.

Having itself generated token 34, the network equipment 16 performs, or assists the radio network equipment 12 with, verification of whether the token 34 that the network equipment 16 generated matches or corresponds to the token 26 that the wireless device 14 generated after the wireless device 14 received the capability enquiry 24. In embodiments where the network equipment 16 itself performs this verification, as shown in FIG. 1, the network equipment 16 may receive the token 26 that the wireless device 14 generated, either from the wireless device 14 itself over the NAS 20 or from the radio network equipment 12, and then compare the tokens 26, 34 to determine whether they match (or otherwise correspond to one another). The network equipment 16 may transmit a notification (not shown) to the radio network equipment 16 indicating an outcome of this verification, e.g., for use by the radio network equipment 16 in determining how to treat the capability information 22 received from the wireless device 14. By contrast, in embodiments where the network equipment 16 assists the radio network equipment 16 with this verification, the network equipment 16 may transmit the token 34 that the network equipment 16 generated to the radio network equipment 12, so that the radio network equipment 12 can compare the tokens 26, 34 to determine whether they match (or otherwise correspond to one another). In either case, verification that the tokens 26, 34 indeed match or correspond to one another means or supports the conclusion that the capability information 22 was securely communicated from the wireless device 14 to the radio network equipment 12 over the AS 18, e.g., even without security having been activated on the AS 18.

Figure 2:
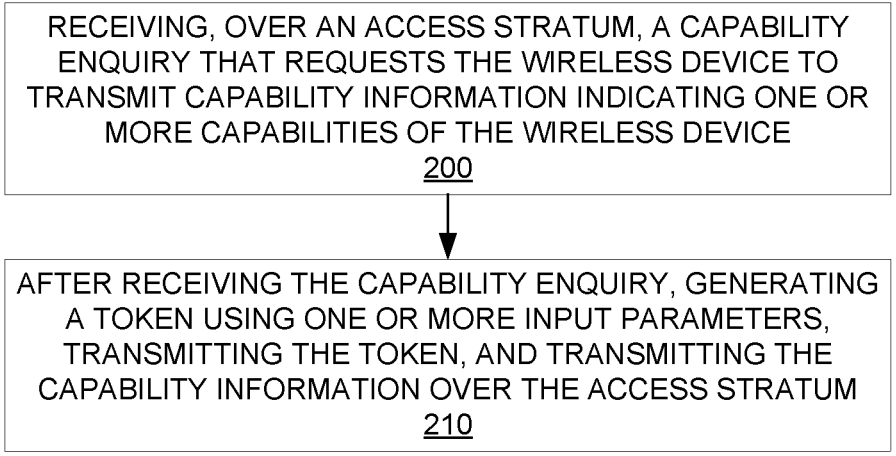
FIG. 2 is a logic flow diagram of a method performed by a wireless device according to some embodiments.

In view of the above modifications and variations, FIG. 2 depicts a method performed by a wireless device 14 in accordance with particular embodiments. The method includes receiving, over an access stratum 18, a capability enquiry 24 that requests the wireless device 14 to transmit capability information 22 indicating one or more capabilities of the wireless device 14 (Block 200). The method may also include, after receiving the capability enquiry 24, generating a token 26 using one or more input parameters 28, transmitting the token 26, and transmitting the capability information 22 over the access stratum 18 (Block 210). In some embodiments, the one or more input parameters 28 include at least some part of the capability enquiry 24 and/or at least some of the capability information 22. Alternatively or additionally, in some embodiments, the token 26 is generated or transmitted based on a non-access stratum security context 30 at the wireless device 14.

In some embodiments, the one or more input parameters 28 include at least some part of the capability enquiry 24.

In some embodiments, the one or more input parameters 28 include at least some of the capability information 22.

In some embodiments, the one or more input parameters 28 include a key that is in or derived from the non-access stratum security context 30. Additionally or alternatively, the one or more input parameters 28 in some embodiments include a count value included in the non-access stratum security context 30.

In some embodiments, generating the token 26 comprises calculating the token 26 as a hash, or as a keyed hash, over the at least some of the capability information 22.

In some embodiments, the capability enquiry 24 is received over the access stratum without access stratum security. Additionally or alternatively, the capability information 22 is transmitted over the access stratum without access stratum security.

In some embodiments, transmitting the capability information 22 comprises transmitting a response to the capability enquiry 24. In some embodiments, the response includes the capability information 22 and the token 26.

In some embodiments, transmitting the token 26 comprises transmitting the token 26 to radio network equipment 12 over the access stratum 18.

In some embodiments, transmitting the token 26 comprises transmitting the token 26 to core network equipment in a non-access stratum message.

In some embodiments, the capability information 22 comprises access stratum capability information or radio capability information.

In some embodiments, the wireless device 14 lacks support for access stratum security. Additionally or alternatively, the wireless device 14 only supports control plane cellular internet of things optimization functionality.

Figure 3:
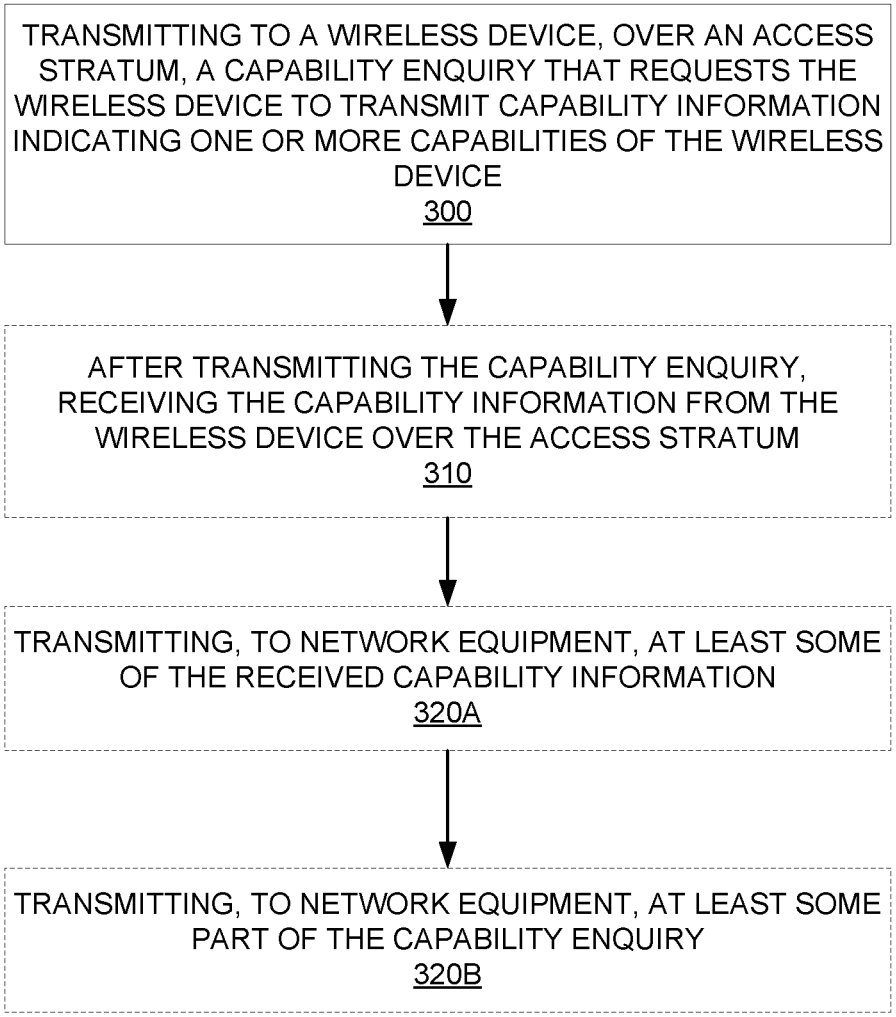
FIG. 3 is a logic flow diagram of a method performed by radio network equipment according to some embodiments.

FIG. 3 depicts a method performed by radio network equipment 12 in accordance with other particular embodiments. The method includes transmitting to a wireless device 14, over an access stratum 18, a capability enquiry 24 that requests the wireless device 14 to transmit capability information 22 indicating one or more capabilities of the wireless device 14 (Block 300). In some embodiments, the method further comprises transmitting, to network equipment 16, at least some part of the capability enquiry 24 (Block 320B).

In some embodiments as shown, the method may also include, after transmitting the capability enquiry 24, receiving the capability information 22 from the wireless device 14 over the access stratum 18 (Block 310). In one or more such embodiments, the method may further comprise transmitting, to network equipment 16, at least some of the received capability information 22 (Block 320A).

Generally, then, the method may comprise transmitting, to network equipment 16, at least some of the received capability information 22 and/or at least some part of the capability enquiry 24.

In some embodiments, the method further comprises receiving, from the network equipment 16, a notification indicating whether the network equipment 16 verifies the capability enquiry 24 and/or the capability information 22 as being securely communicated. Additionally or alternatively, the notification indicates whether, or that, a token 34 generated by the network equipment 12 matches or corresponds to a token 26 generated by the wireless device 14.

In some embodiments, the capability information 22 comprises access stratum capability information or radio capability information.

In some embodiments, the wireless device 14 lacks support for access stratum security. Additionally or alternatively, the wireless device 14 only supports control plane cellular internet of things optimization functionality.

In some embodiments, the method further comprises, after transmitting the capability enquiry 24 to the wireless device 14, receiving a token 26 from the wireless device 14 and transmitting the received token 26 to the network equipment 16.

Figure 4:
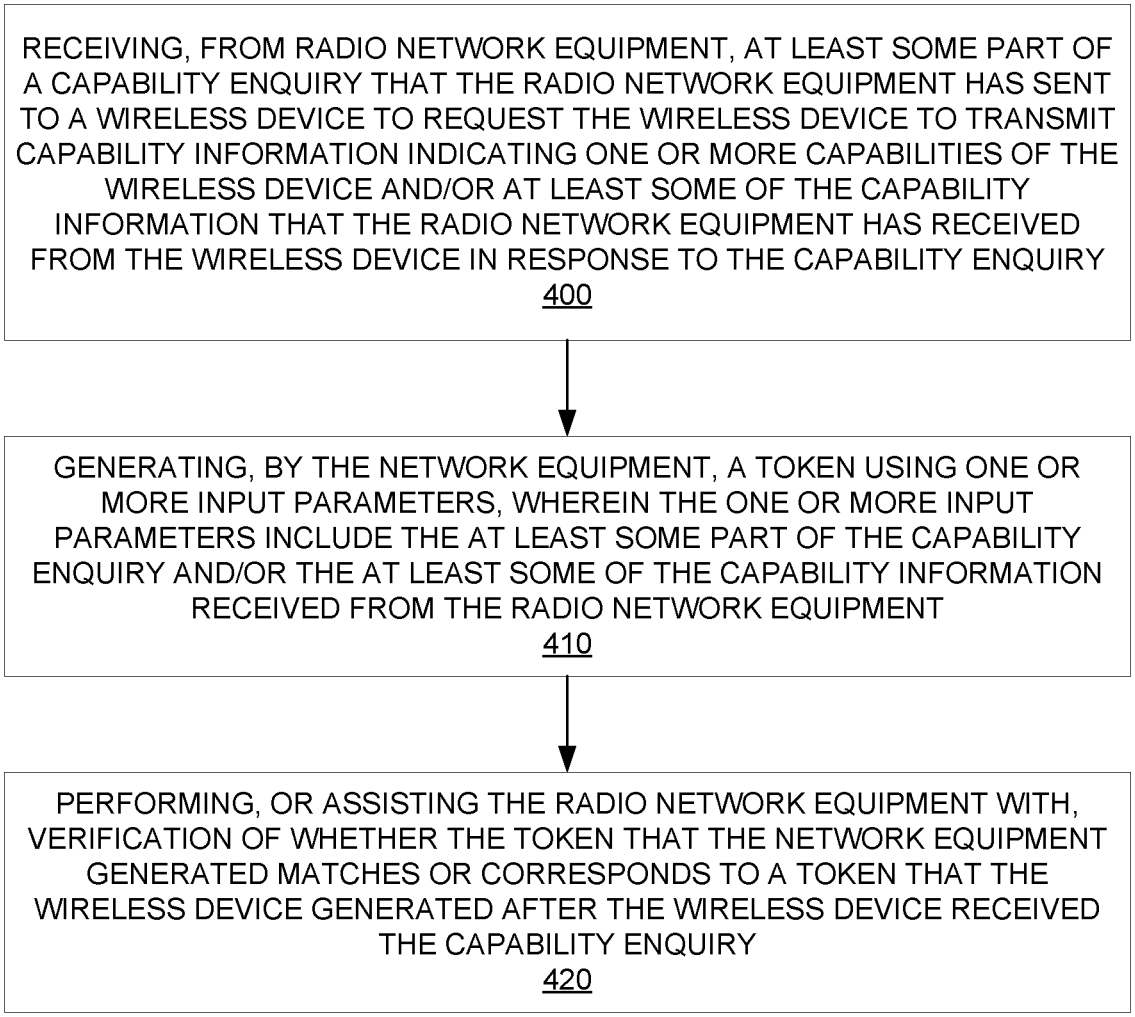
FIG. 4 is a logic flow diagram of a method performed by network equipment according to some embodiments.

FIG. 4 depicts a method performed by network equipment 16 in accordance with other particular embodiments. The method includes receiving, from radio network equipment 12, at least some part of a capability enquiry 24 that the radio network equipment 24 has sent to a wireless device 14 to request the wireless device 14 to transmit capability information 22 indicating one or more capabilities of the wireless device 14 and/or at least some of the capability information 22 that the radio network equipment 12 has received from the wireless device 14 in response to the capability enquiry 24 (Block 400). The method may also include generating, by the network equipment 16, a token 34 using one or more input parameters 36, wherein the one or more input parameters 36 include the at least some part of the capability enquiry 24 and/or the at least some of the capability information 22 received from the radio network equipment 12 (Block 410). In some embodiments, the method further comprises performing, or assisting the radio network equipment 12 with, verification of whether the token 34 that the network equipment 16 generated matches or corresponds to a token 26 that the wireless device 14 generated (e.g., a token 26 that the wireless device 14 generated after the wireless device 14 received the capability enquiry 24). (Block 420).

In some embodiments, the method further comprises after the network equipment 16 receives the capability information 22 from the wireless device 14, receiving the token 26 that the wireless device 14 generated. In one or more of these embodiments, receiving the token 26 that the wireless device 14 generated comprises receiving, from the radio network equipment 12, the token 26 that the wireless device 14 generated. In one or more of these embodiments, receiving the token 26 that the wireless device 14 generated comprises receiving, from the wireless device 14, the token 26 that the wireless device 14 generated. In one or more of these embodiments, the token 26 that the wireless device 14 generated is received in a non-access stratum message. In one or more of these embodiments, the token 26 that the wireless device 14 generated is received over a non-access stratum 20 after activation of security on the non-access stratum 20.

In some embodiments, generating the token 34 by the network equipment 16 comprises generating the token 34 by the network equipment 16 based on a non-access stratum security context 30 at the network equipment 16.

In some embodiments, the one or more input parameters 36 include a key that is in or derived from the non-access stratum security context 30. Additionally or alternatively, the one or more input parameters 36 include a count value included in the non-access stratum security context 30.

In some embodiments, generating the token 34 comprises calculating the token 34 as a hash, or as a keyed hash, over the at least some of the capability information 22.

In some embodiments, the one or more input parameters 36 include at least some of the capability information 22.

In some embodiments, the one or more input parameters 36 include at least some part of the capability enquiry 24.

In some embodiments, the capability information 22 comprises access stratum capability information or radio capability information.

In some embodiments, the wireless device 14 lacks support for access stratum security. Additionally or alternatively, the wireless device 14 only supports control plane cellular internet of things optimization functionality.

In some embodiments, the method further comprises assisting the radio network equipment 12 with the verification. In some embodiments, assisting the radio network equipment 12 comprises transmitting the token 34 generated by the network equipment 16 to the radio network equipment 12.

Figure 5:
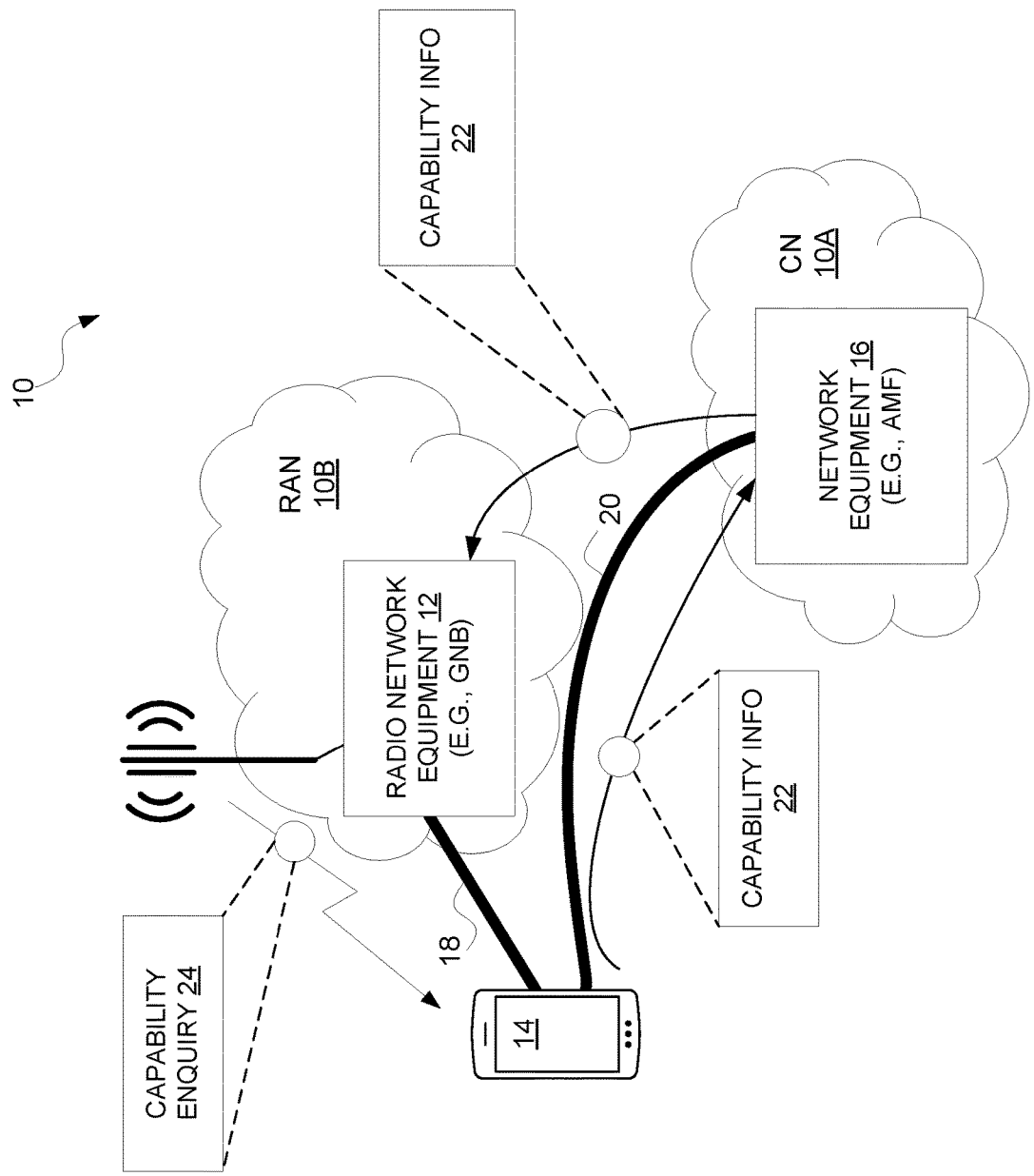
FIG. 5 is a block diagram of a wireless communication network according to other embodiments.

FIG. 5 depicts still other embodiments herein that protect the transfer of capability information 22 from the wireless device 14 by exploiting NAS level security and/or multiple protocol layers, e.g., even without reliance on AS level security. As shown, the wireless device 14 receives the capability enquiry 24 from the radio network equipment 12, e.g., over the AS 18. But the wireless device 14 transmits the capability information 22 to the network equipment 16, e.g., over the NAS 20. The network equipment 16 then forwards the capability information 22 to the radio network equipment 12. This may operate to exploit activation of security on the NAS 20 for securely communicating the capability information 22, even when AS level security is not activated.

Generally, then, FIG. 5 exemplifies some embodiments in which the wireless device 14 receives a request (e.g., capability enquiry 24) at a first protocol layer of the wireless device 14 (e.g., a protocol layer of the AS 18), but transmits a response (e.g., capability information 22) from a second protocol layer of the wireless device 14 (e.g., a protocol layer of the NAS 20).

Figure 6:
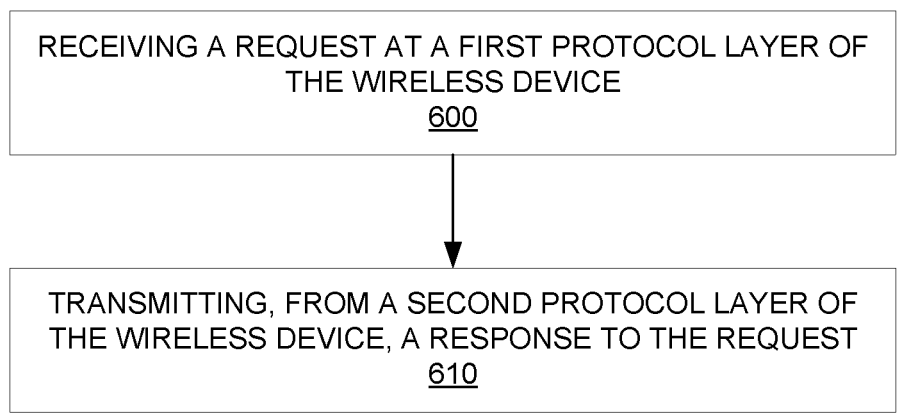
FIG. 6 is a logic flow diagram of a method performed by a wireless device according to other embodiments.

FIG. 6 depicts a method performed by a wireless device 14 in accordance with other particular embodiments. The method includes receiving a request at a first protocol layer of the wireless device 14 (Block 600). The request may for instance be a capability enquiry 24 that requests the wireless device 14 to transmit capability information 22 indicating one or more capabilities of the wireless device 14. Regardless, the method also comprises transmitting, from a second protocol layer of the wireless device 14, a response to the request (Block 610). Where the request is a capability enquiry 24, for instance, the response may include the requested capability information 22.

In some embodiments, the request is received at the first protocol layer without security on the first protocol layer. In this case, the response is transmitted from the second protocol layer with security on the second protocol layer.

In some embodiments, transmitting the response comprises generating a first protocol layer message, encapsulating the first protocol layer message in the response, and transmitting the response from the second protocol layer.

In some embodiments, the wireless device 14 lacks support for security at the first protocol layer. Additionally or alternatively, the wireless 14 device only supports control plane cellular internet of things optimization functionality.

In some embodiments, the first protocol layer is, corresponds to, or is included in an access stratum 18. Additionally or alternatively, the second protocol layer is, corresponds to, or is included in a non-access stratum 20.

In some embodiments, the capability information 22 comprises access stratum capability information or radio capability information.

Figure 7:
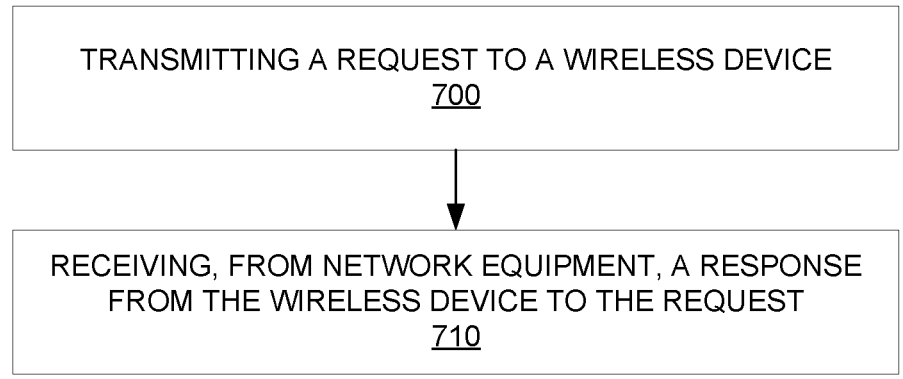
FIG. 7 is a logic flow diagram of a method performed by radio network equipment according to other embodiments.

FIG. 7 depicts a method performed by radio network equipment 12 in accordance with other particular embodiments. The method includes transmitting a request to a wireless device 14 (Block 700). The request may for instance be a capability enquiry 24 that requests the wireless device 14 to transmit capability information indicating one or more capabilities of the wireless device 14. Regardless, the method also includes receiving, from network equipment 16, a response from the wireless device 14 to the request (Block 710). Where the request is a capability enquiry 24, for instance, the response may include the requested capability information.

In some embodiments, the request is transmitted from a first protocol layer of the radio network equipment 12 without security on the first protocol layer. In some embodiments, the response is received from the network equipment 16 on a protected interface with the network equipment 16.

In some embodiments, the request is transmitted on an access stratum 18.

In some embodiments, the wireless device 14 lacks support for security on an access stratum 18. Additionally or alternatively, the wireless device 14 only supports control plane cellular internet of things optimization functionality.

In some embodiments, the capability information 22 comprises access stratum capability information or radio capability information.

Figure 8:
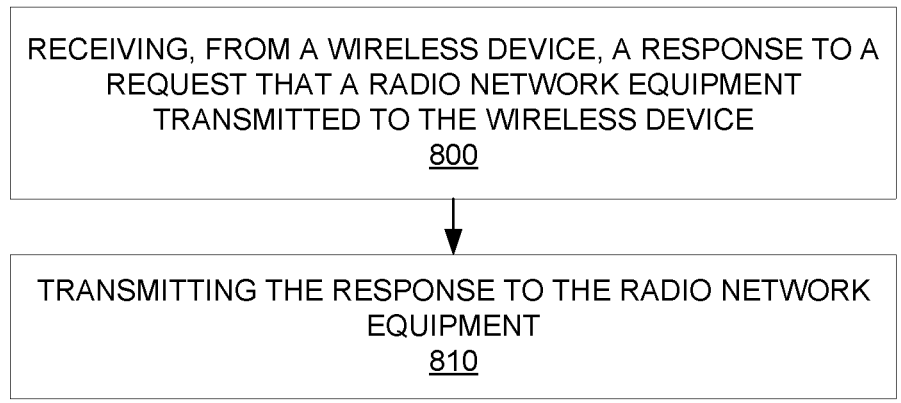
FIG. 8 is a logic flow diagram of a method performed by network equipment according to other embodiments.

FIG. 8 depicts a method performed by network equipment 16 in accordance with other particular embodiments. The method includes receiving, from a wireless device 14, a response to a request that a radio network equipment 12 transmitted to the wireless device 14 (Block 800). The request may for instance be a capability enquiry 24 that requests the wireless device 14 to transmit capability information indicating one or more capabilities of the wireless device 14. Regardless, the method further comprises transmitting the response to the radio network equipment 12 (Block 810). Where the request is a capability enquiry 24, for instance, the response may include the requested capability information.

In some embodiments, the request is transmitted from a first protocol layer of the radio network equipment 12 to the wireless device 14 without security on the first protocol layer. In some embodiments, the response is transmitted from the network equipment 16 on a protected interface with the radio network equipment 12.

In some embodiments, the request is transmitted from the radio network equipment 12 to the wireless device 14 on an access stratum 18.

In some embodiments, the wireless device 14 lacks support for security on an access stratum 18. Additionally or alternatively, the wireless device 14 only supports control plane cellular internet of things optimization functionality.

In some embodiments, the capability information 22 comprises access stratum capability information or radio capability information.

Embodiments herein also include corresponding apparatuses. Embodiments herein for instance include a wireless device 14 configured to perform any of the steps of any of the embodiments described above for the wireless device 14.

Embodiments also include a wireless device 14 comprising processing circuitry and power supply circuitry. The processing circuitry is configured to perform any of the steps of any of the embodiments described above for the wireless device 14. The power supply circuitry is configured to supply power to the wireless device 14.

Embodiments further include a wireless device 14 comprising processing circuitry. The processing circuitry is configured to perform any of the steps of any of the embodiments described above for the wireless device 14. In some embodiments, the wireless device 14 further comprises communication circuitry.

Embodiments further include a wireless device 14 comprising processing circuitry and memory. The memory contains instructions executable by the processing circuitry whereby the wireless device 14 is configured to perform any of the steps of any of the embodiments described above for the wireless device 14.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 14. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include radio network equipment 12 configured to perform any of the steps of any of the embodiments described above for the radio network equipment 12

Embodiments also include radio network equipment 12 comprising processing circuitry and power supply circuitry. The processing circuitry is configured to perform any of the steps of any of the embodiments described above for the radio network equipment 12. The power supply circuitry is configured to supply power to the radio network equipment 12.

Embodiments further include radio network equipment 12 comprising processing circuitry. The processing circuitry is configured to perform any of the steps of any of the embodiments described above for the radio network equipment 12. In some embodiments, the radio network equipment 12 further comprises communication circuitry.

Embodiments further include radio network equipment 12 comprising processing circuitry and memory. The memory contains instructions executable by the processing circuitry whereby the radio network equipment 12 is configured to perform any of the steps of any of the embodiments described above for the radio network equipment 12.

Embodiments herein additionally include network equipment 16 configured to perform any of the steps of any of the embodiments described above for the network equipment 16.

Embodiments also include network equipment 16 comprising processing circuitry and power supply circuitry. The processing circuitry is configured to perform any of the steps of any of the embodiments described above for the network equipment 16. The power supply circuitry is configured to supply power to the network equipment 16.

Embodiments further include network equipment 16 comprising processing circuitry. The processing circuitry is configured to perform any of the steps of any of the embodiments described above for the network equipment 16. In some embodiments, the network equipment 16 further comprises communication circuitry.

Embodiments further include network equipment 16 comprising processing circuitry and memory. The memory contains instructions executable by the processing circuitry whereby the network equipment 16 is configured to perform any of the steps of any of the embodiments described above for the network equipment 16.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
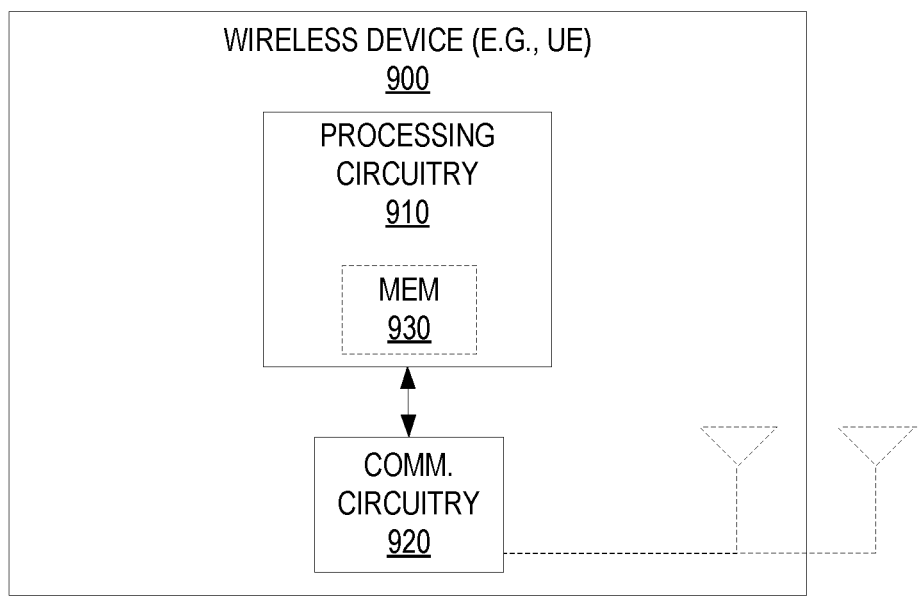
FIG. 9 is a block diagram of a wireless device according to some embodiments.

FIG. 9 for example illustrates a wireless device 900 (e.g., wireless device 14) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, e.g., in FIGS. 2 and/or 6 such as by executing instructions stored in memory 930. The processing circuitry 910 in this regard may implement certain functional means, units, or modules.

Figure 10:
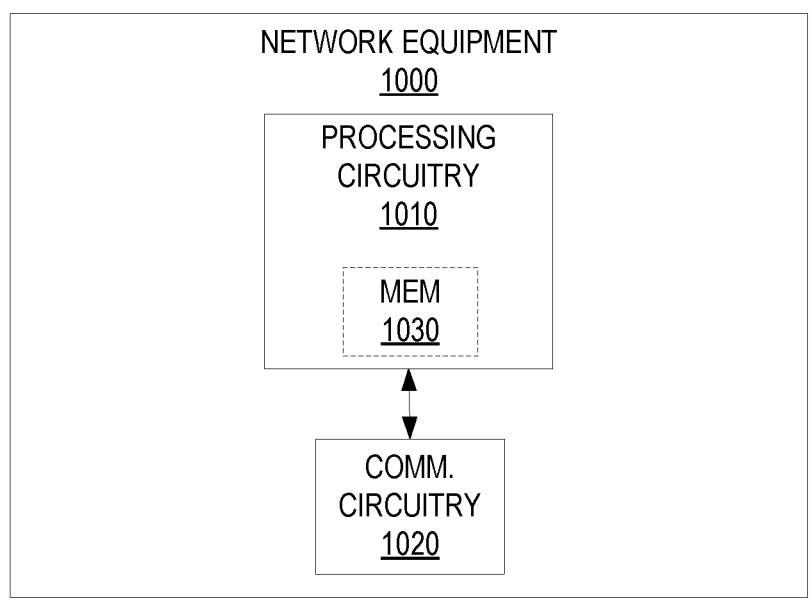
FIG. 10 is a block diagram of network equipment according to some embodiments.

FIG. 10 illustrates network equipment 1000 (e.g., radio network equipment 12 or network equipment 16) as implemented in accordance with one or more embodiments. As shown, the network equipment 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, e.g., in FIG. 3, 4 7, or 8, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In some embodiments below, the wireless device 14 in FIGS. 1 and 5 is exemplified as a user equipment (UE), the radio network equipment 12 in FIGS. 1 and 5 is exemplified as an eNB or gNB, and the network equipment 16 in FIGS. 1 and 5 is exemplified as implementing an Access and Mobility Function (AMF). Moreover, in some embodiments, the capability information in FIGS. 1 and 5 is exemplified in terms of UE capabilities (caps), AS capabilities, NAS capabilities, radio capabilities, and/or security capabilities.

Note that some embodiments herein are described in terms of 5G terminologies, where the radio and the core belong to 5th generation of mobile network. A person skilled in the art will appreciate that the teachings are also applicable to 4G, where the radio and the core belong the 4th generation of mobile network. The teachings could also be applicable to a similar setup in future releases of 5G or future generation of mobile networks like 6G.

Figure 11:
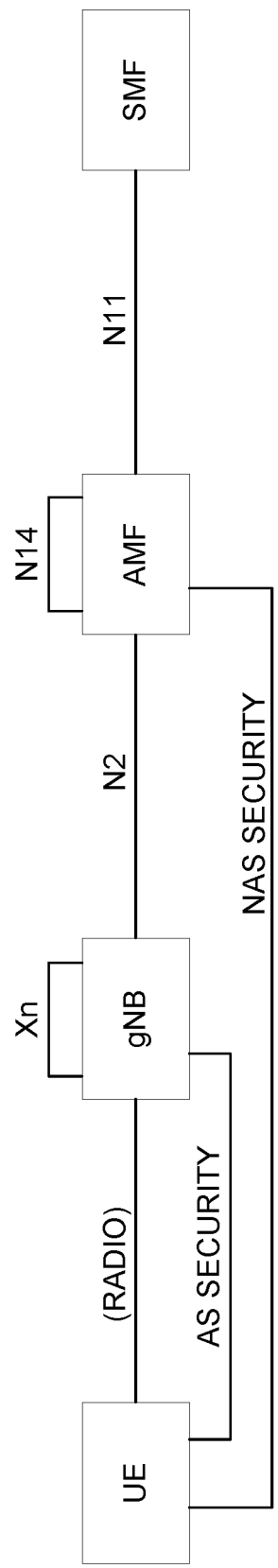
FIG. 11 is a block diagram of a 5G network according to some embodiments.

A simplified version of a 5G network is shown in FIG. 11. The 5G network architecture is described in the 3GPP TS 23.501 v16.3.0.

In FIG. 11, the UE (User Equipment) is a mobile device used by the user to wirelessly access the network. The radio access network function or base station, called gNB (Next Generation Node B that supports new radio, NR), is responsible for providing wireless radio communication to the UE and connecting the UE to the core network. The core network function called AMF (Access and Mobility Management Function) is responsible for handling the mobility of the UE, among other responsibilities. Another core network function called SMF (Session Management Function) is responsible for handling the session and traffic steering of the UE, among other responsibilities. The UE interacts with the gNB over-the-air using the radio interface. The gNB in turn interacts with the AMF using the interface called the N2. The interface between the AMF and the SMF is called the N11. The gNBs interact with each other using the Xn interface. Similarly, the AMFs interact with each other using the N14 interface. What is not shown in the diagram is that the base station in 5G radio access network could also be what is called ng-eNB (which supports E-UTRA). The gNB and ng-eNB are combinedly called NG-RAN in the 5G architecture. Note that the N2 interface is also known an the NG interface.

The logical aspects between the UE and the AMF are referred to as NAS (non-access stratum) and that between the UE and the gNB is referred to as AS (access stratum). Correspondingly, the security of communication (control plane and user plane, if applicable) are referred to as NAS security and AS security, respectively. When a state of security is established between the UE and the AMF, both of them store the relevant security data, e.g., NAS security key, security key identifier, security capabilities, various counters, etc. Such a state of security between the UE and the AMF including the security data is referred to as NAS security context. Similarly, the AS security context refers to the state of security including security data between the UE and the gNB. The AS security context is derived from the NAS security context.

UE Capabilities

To allow a wide range of UE implementations, different UE capabilities are specified in 4G and 5G. The UE capabilities are sent by the UE to the network when a connection is established and is used by the network to select a configuration that is supported by the UE.

In general, the UE capabilities can be classified into two categories depending on which layer of the protocol hierarchy the given capability is related to. The access stratum (AS) level capabilities are access technology dependent parts of the capability information, such as UE power class and supported frequency bands. The AS capabilities are used by the radio access network (i.e. the eNB, ng-eNB, gNB) and therefore they are sometimes called radio capabilities. The non-access stratum (NAS) level capabilities are the capabilities which are not directly/only related or to access stratum such as supported security algorithms. The NAS capabilities are used by the core network (i.e. Evolved Packet Core, EPC, or 5G Core, 5GC).

Without loss of generality, embodiments herein will be illustrated with respect to AS capability. Unless specified otherwise, the term UE capabilities refer to the AS capabilities. However, persons skilled-in-the-art should appreciate that the teachings herein apply to both AS and NAS capabilities, and to radio and security capabilities.

A person skilled-in-the-art should also appreciate that the teachings herein do not limit the applicability only to EPS or 5GS.

The UE capabilities are heretofore transferred using RRC signaling from the UE to the radio access node. In order to avoid requiring UEs to send the AS capabilities over the radio interface each time the UE transitions to connected mode (i.e. when the UE-specific context is created in the radio access network), the radio access node stores the AS capabilities in the core network (i.e. Mobility Management Entity, MME, AMF) while the UE is in idle mode. At subsequent transitions to connected mode, the access node can retrieve the AS capabilities from the core network instead of requesting them again from the UE.

The AS capabilities are typically retrieved from the UE when the UE attaches to the network for the first time. Since the core network does not have any valid UE capability information stored in this case, no UE capabilities will be provided to the radio access node by the core network (i.e. MME/AMF) when the initial UE context is established after the RRC connection setup. This will cause the radio access node to retrieve the UE capabilities from the UE using the UE capability transfer procedure and upload them to the core network. The initial attach and the capability retrieval as specified heretofore is illustrated in FIG. 12 for the case of NR, e.g., as an example context for some embodiments herein.

Figure 12:
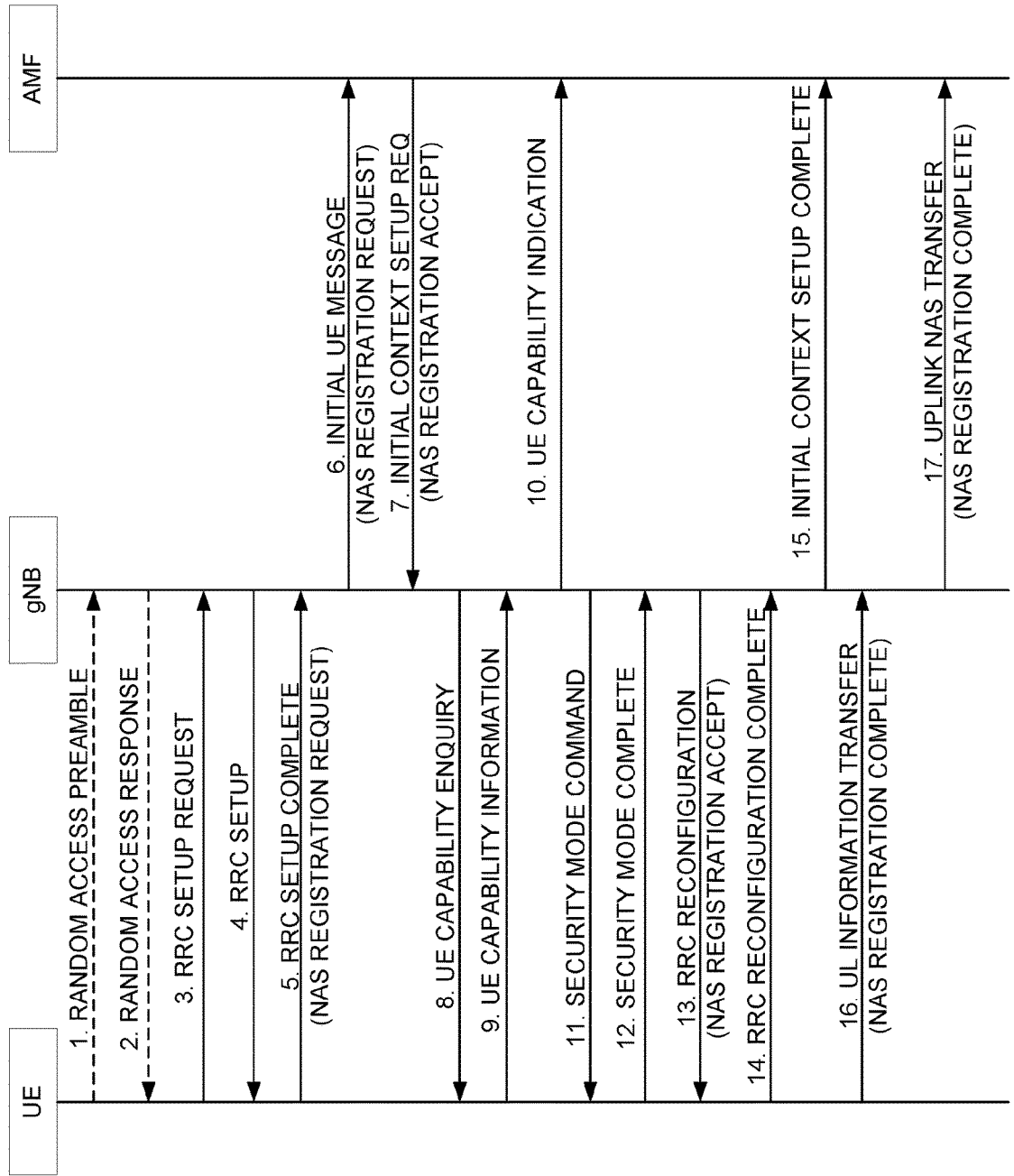
FIG. 12 is a call flow diagram of a procedure for initial attach and capability retrieval according to some embodiments.

As shown in FIG. 12, the UE may perform random access to the gNB, e.g., if uplink synchronization is needed (Steps 1-2). Then, after the UE establishes an RRC connection with the gNB (Steps 3-4), the UE sends an RRC Setup Complete message to the gNB, including a NAS Registration Request (Step 5). In response to receiving the NAS Registration Request, the gNB sends the NAS Registration Request to the AMF within an Initial UE message (Step 6). The AMF in this example responds with a NAS Registration Accept within an Initial Context Setup Req message (Step 7). Since in this example the AMF's response did not include UE capabilities for the UE, the gNB retrieves the UE capabilities from the UE (Steps 8-9), and then transmits those UE capabilities to the AMF (Step 10) for subsequent retrieval if needed. Registration proceeds with a Security Mode Command (SMC) procedure (Steps 11-12) and RRC Reconfiguration (Steps 13-14), followed by completion of the NAS Registration (Steps 15-17).

Figure 13:
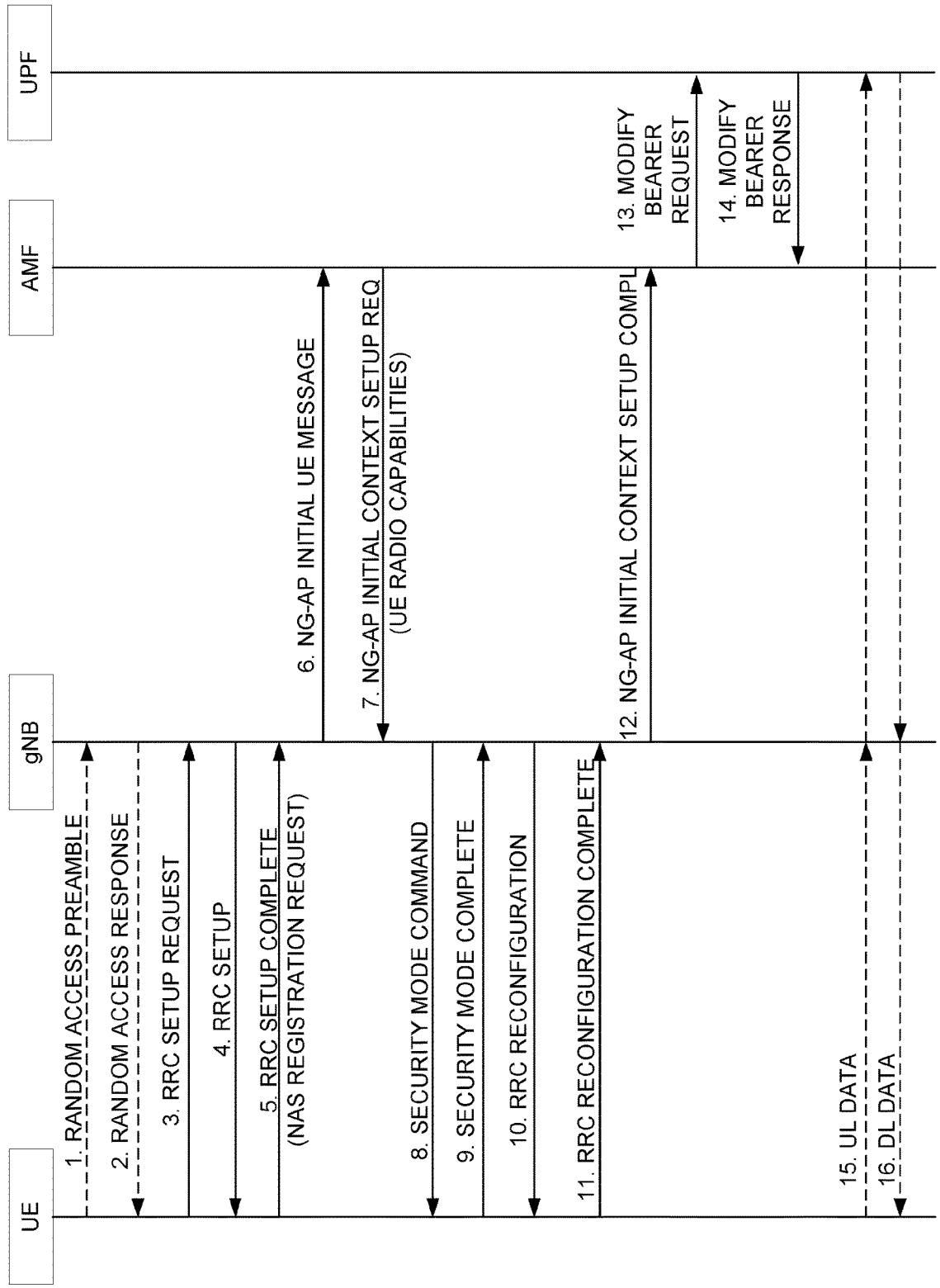
FIG. 13 is a call flow diagram of a procedure for an AMF to provide UE capabilities to a gNB according to some embodiments.

The next time the UE connects to the network (for e.g. a service request) the UE capabilities are stored in the core network (AMF) and will be provided to the radio access node as part of the initial UE context establishment. This is illustrated in FIG. 13 for the case of NR, where the steps are similar to those in FIG. 12 except that the AMF provides the UE capabilities to the gNB in response to the Initial UE message (Step 7).

In both LTE and NR, the network can request the UE to provide its capabilities for specific RAT(s) (Radio Access Technologies) in the UE capability enquiry message. When responding, the UE include its capabilities for each of the indicated RATs in a RAT-specific capability container in the UE capability information message. For NR, the network can further request the UE to provide NR capabilities only for a restricted set of band combinations to reduce the size of the capability information that needs to be transferred.

Traditionally, UE capabilities have been considered static information which in principle means they can be retrieved once and then stored in the core network for future use. However, in recent years there has been a demand from UE vendors to be able to dynamically change the UE capabilities depending on the scenario and environment the UE is in. Therefore, in NR and later releases of LTE, the UE can indicate to the core network that it has updated its UE capabilities in the tracking area update procedure, which will cause the core network to trigger a new retrieval of the UE capabilities.

Some embodiments herein protect the transfer of UE capabilities in this context, even if the UE capabilities are transferred before AS security activation and even if AS security is never activated. That is, even if the UE capabilities are sent by the UE to the network without confidentiality and integrity protection over the air interface, some embodiments still nonetheless protect against an attacker manipulating the UE capabilities and attempting to adversely affect the communication between the UE and network.

Some embodiments are therefore applicable for securing UE capabilities even in cases where UEs lack support for AS security, such as UEs that only support data transfer over the NAS layer, referred to as Control Plane (CP) Cellular Internet of Things (CIoT) Evolved Packet System (EPS) Optimisation in 3GPP TS 23.401v16.5.0 and CP CIoT 5GS Optimisation in 3GPP TS 23.501v16.3.0. This will be referred to as CP CIoT Optimisation herein. The CP CIoT Optimisation is based on transport of user data or Short Message Service (SMS) messages via MME or AMF by encapsulating them in the NAS layer, reducing the total number of control plane messages when handling a short data transaction. To reduce the UE and network implementation complexity, this CP CIoT Optimisation functionality is not using security on the AS layer, i.e., on the Uu interface between the (eNB/ng-eNB or) gNB and the UE. For details see 3GPP TS 38.300v15.0.0.

Alternatively or additionally, some embodiments are advantageous in that they are future proof, allowing the network to indicate what kind of UE capabilities the network wants in the future, rather that the UE always reporting static UE capabilities. For example, some embodiments provide such future proofness by the UE calculating the security token only after receiving the UE capability enquiry.

Some embodiments also allow binding of the capability information request and response, which assures the network that the UE capabilities from the UE are actually corresponding to what the network intended to receive. The network can then handle unexpected UE capabilities wisely.

Note further that some embodiments herein can be applied even if signaling optimizations are used for radio capabilities, e.g., as specified in 3GPP TR 23.743. Such optimizations may include for instance segmentation of UE capabilities, compression of UE capabilities, and assigning a short ID to UE capabilities, referred to as the UE capability ID. These enhancements may optimize radio capability signaling since the UE capabilities tend to become very large in NR due to the many band combinations and radio parameters, e.g. in some cases even larger than 65 kB.

More particularly, some embodiments herein may be grouped into the following enumerated solutions:

Solution A: The UE gets the capability enquiry. The UE calculates and sends a security token in addition to UE capabilities to the NG-RAN. The NG-RAN transfers the UE capabilities, the security token, and necessary information to the AMF. The AMF verifies the security token.

Solution B: The UE and NG-RAN run the capability transfer procedure. The NG-RAN sends UE capabilities and necessary information to the AMF, and the UE calculates and sends a security token to the AMF. The AMF verifies the security token.

Solution C: The NG-RAN does the UE capability enquiry in the RRC/AS layer. The UE responds in the NAS layer.

Solution D: The NG-RAN does the UE capability enquiry via the AMF.

Consider now more detailed description of the solutions above, mainly focusing on 5G nodes and functionalities. They are equally applicable to 4G nodes and functionalities.

Figure 14:
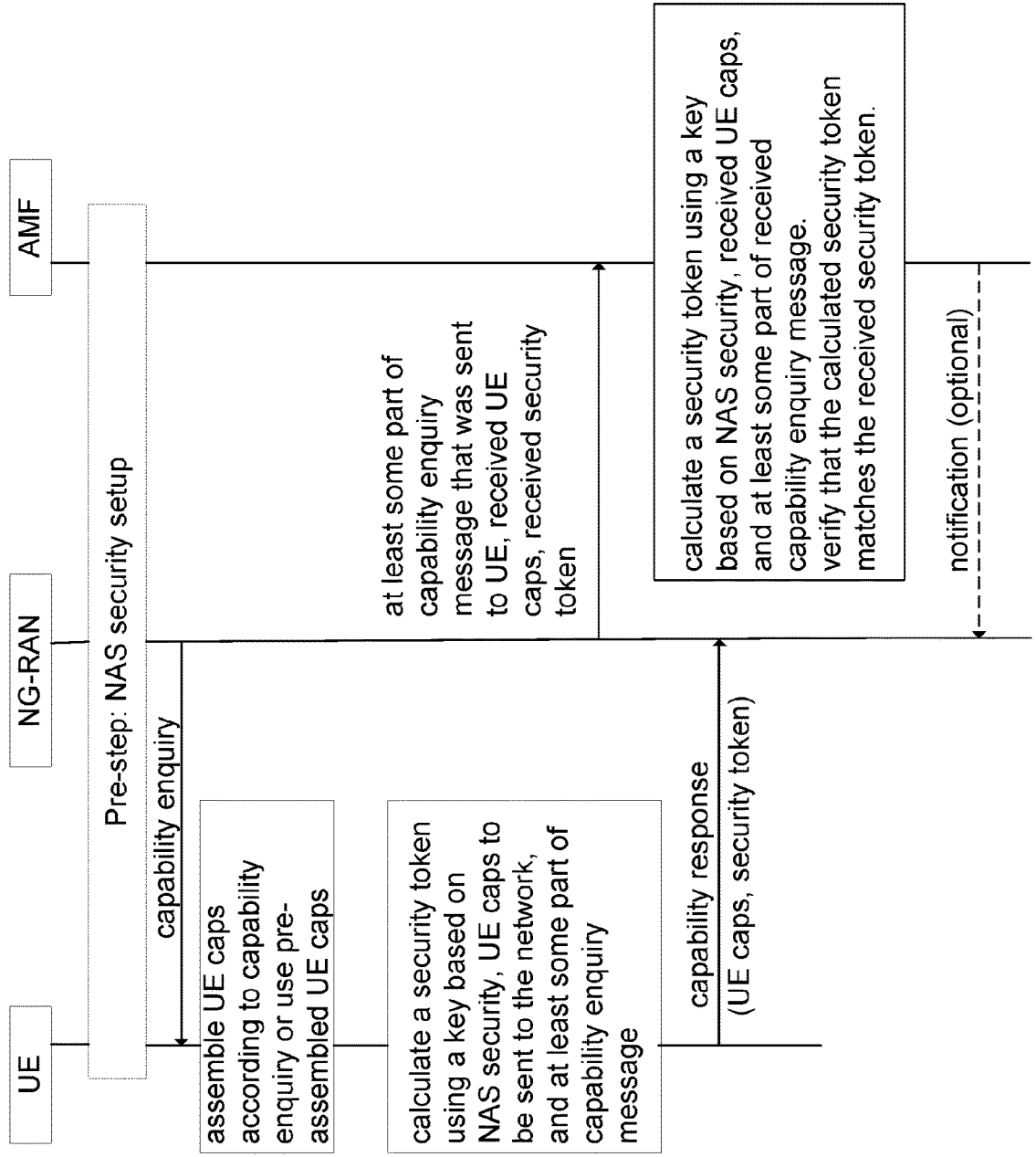
FIG. 14 is a call flow diagram of a procedure for protecting the transfer of UE capabilities according to some embodiments.

FIG. 14 shows Solution A according to some embodiments. As shown, the UE calculates a security token only after the UE receives the capability enquiry from the NG-RAN. The UE in this example can therefore calculate the security token using the actual UE capabilities to be sent to the network and at least part of the capability enquiry message. The UE may calculate the security token also using a key based on NAS security. The UE correspondingly transmits the capability response to the NG-RAN, including the UE capabilities and the security token in the response. The NG-RAN in turn transmits at least some part of the capability enquiry message (that was sent to the UE) to the AMF, along with the received UE capabilities and the received security token. The AMF likewise calculates a security token using the received UE capabilities and at least some part of the received capability enquiry message. The AMF may further calculate the security token using a key based on NAS security. The AMF may then verify that the security token that the AMF calculated matches the security token that the AMF received from the NG-RAN (as provided by the UE). Depending on whether the security tokens match, the AMF may optionally send a notification to the NG-RAN indicating the outcome of the verification. For example, the notification from the AMF could contain OK, NOT OK indications.

Calculating the security token by taking into consideration the capability enquiry brings future-proofness to the solution. In the future, when UEs that support only the CP CIoT optimization assemble UE capabilities differently based on the capability enquiry, then the security token will be correctly calculated at the UE and verified at the network.

Furthermore, using at least some part of the capability enquiry message to calculate the security token provides the so-called binding of request/response messages. To understand the security benefit of such binding, consider what can happen if there was no such a binding. If the response from the UE depended upon the enquiry from the network, then an attacker could have tampered with the enquiry from the network. Mind that the enquiry message is not protected since there is no AS security. After this, the UE will assemble UE capabilities and calculate the security token. The UE sends response to the network. Now, security token verification at the network succeeds. But those UE capabilities were not the ones that the network originally asked for. The network (RAN or the core network) would not have any means to know if the UE actually responded according to the enquiry. This could lead to unintended or non-optimal configuration at the network side. This could also lead to the network needing to re-enquire the UE capabilities, meaning delay and waste of resources (like computation, signaling, etc.). Now, with the binding, the network will detect a security token mismatch if the UE used a different input for the enquiry message.

The security token shown in FIG. 14 may be calculated using any way among several possible ways. One way in some embodiments is to use cryptographic hash functions like SHA-256, SHA-512, MD5, etc. Another way in other embodiments is to use a cryptographic hash function and calculate a keyed-hash, such as HMAC-SHA256, HMAC-SHA3, etc. Yet another way is to calculate the security token using some variation of a key derivation function (KDF) generally used in 3GPP security, for example the ones in TS 33.401 v16.1.0 or TS 33.501 v16.1.0. Another possible way is to use one of the integrity algorithms as defined in TS 33.401 v16.1.0 or TS 33.501 v16.1.0, which use underlying algorithms like the ones based on SNOW 3G, based on Advanced Encryption Standard (AES) in Cipher-based Message Authentication Code (CMAC) mode, or based on ZUC (a word-oriented stream cipher).

In some embodiments, the NG-RAN may use the received UE capabilities either after the NG-RAN received those capabilities from the UE, or after the NG-RAN received the notification from the AMF that the verification succeeded.

Note here that the NG-RAN provides the AMF with necessary information that the AMF needs to compute the security token, as shown in FIG. 14. Mind that on the UE side, calculation of the security token could also use a hash or some other derivation (e.g., length, etc.) over the capability enquiry message as input. In that case, the NG-RAN would provide such a hash or other derivation to the AMF.

In some embodiments, the security token calculation/verification also uses some addition inputs like a freshness parameter (e.g., current time, random number, or nonce) and some counter (to prevent replay attacks). In one such embodiment, the NG-RAN facilitates this so that both the UE and the AMF have the same values of such additional inputs.

Note that the step at the UE where the UE assembles the UE capabilities could be skipped if the UE capabilities are static and are pre-assembled.

Figure 15:
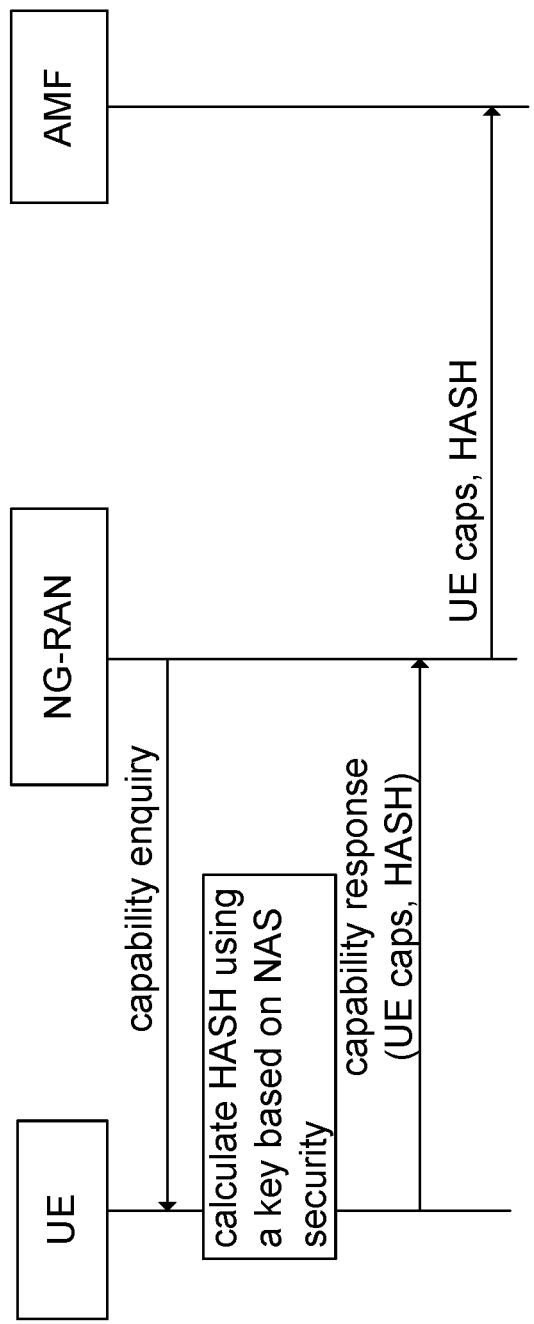
FIG. 15 is a call flow diagram of a procedure for protecting the transfer of UE capabilities according to other embodiments.

FIG. 15 shows a simplistic variation of Solution A where HASH represents the security token, and the binding of request/response is not used.

Figure 16:
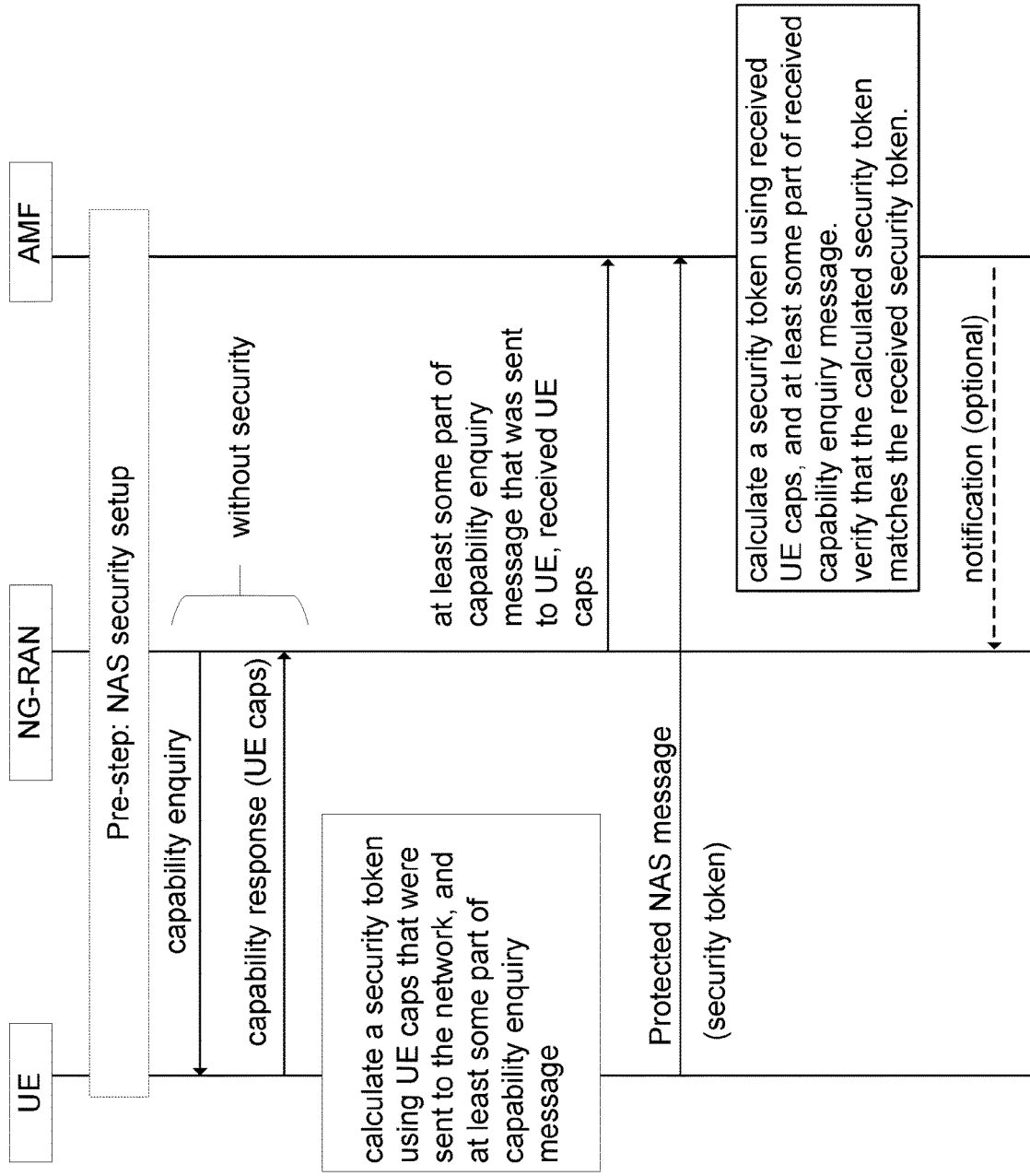
FIG. 16 is a call flow diagram of a procedure for protecting the transfer of UE capabilities according to still other embodiments.

Solution B works as illustrated in FIG. 16.

The relevant details of Solution A also apply to Solution B. One noticeable difference is that Solution A provides the security token during the UE capability transfer procedure (capability enquiry and capability response) itself, whereas Solution B provides the security token after the UE capability transfer procedure. Another difference is that the UE is sending the security token to the AMF and not to NG-RAN. The UE can calculate the security token as explained earlier with respect to Solution A. However, in Solution B, the security token will be transferred in a protected NAS message. Therefore, it is not strictly necessary to use a keyed-hash. A cryptographic hash function without using a key is sufficient.

Figure 17:
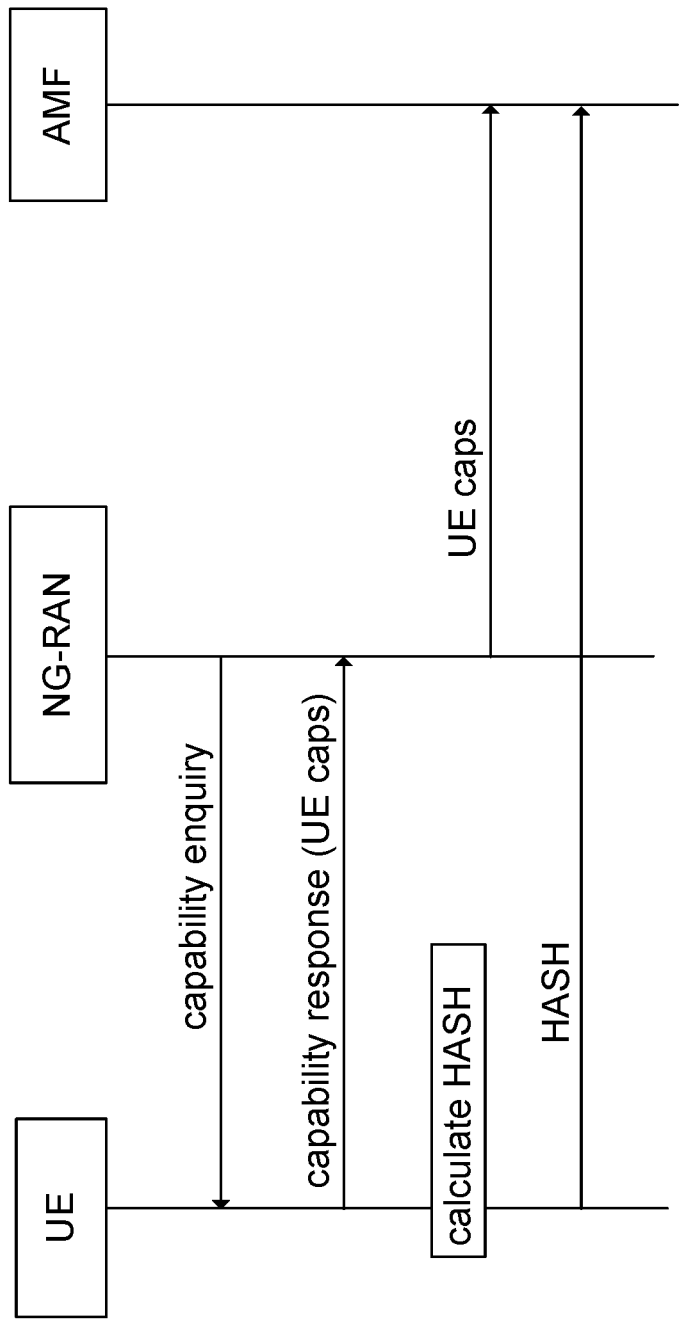
FIG. 17 is a call flow diagram of a procedure for protecting the transfer of UE capabilities according to other embodiments.

FIG. 17 shows a simplistic variation of Solution B where HASH represents security token, and binding of request/response is not used.

Note here that Solutions A and B exemplify the embodiments illustrated in FIG. 1 and FIGS. 2-4.

Figure 18:
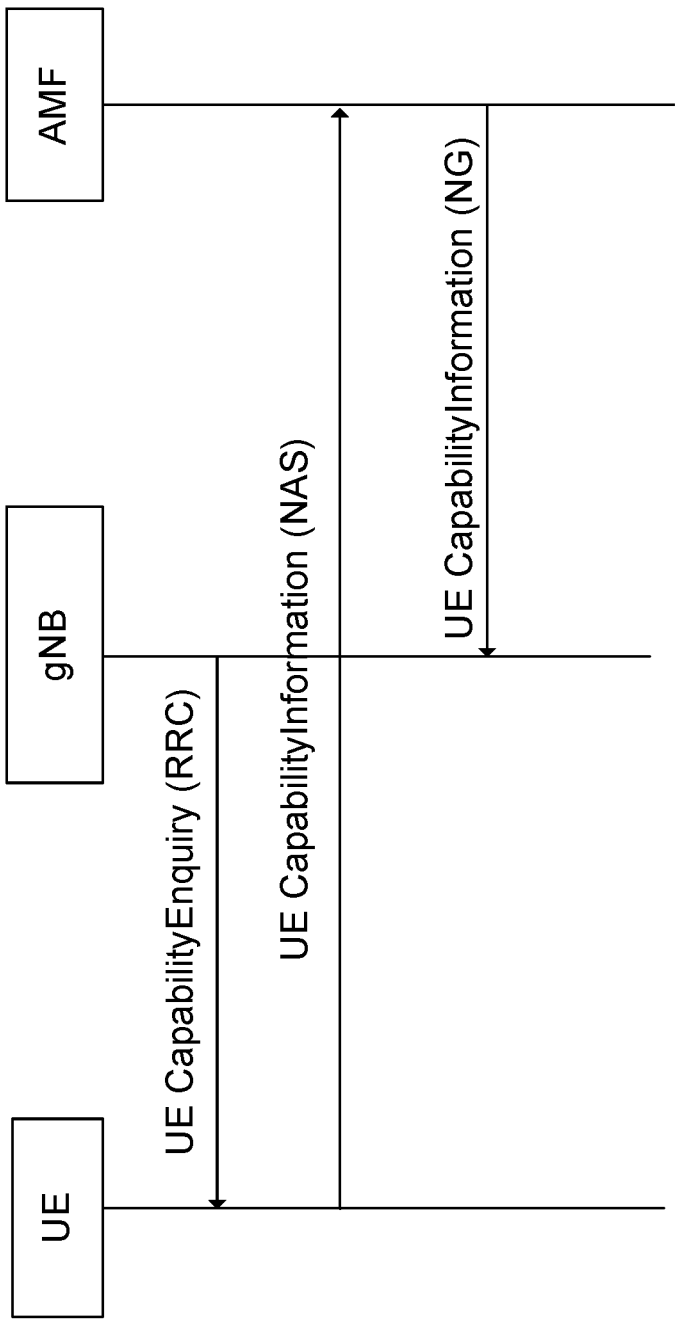
FIG. 18 is a call flow diagram of a procedure for protecting the transfer of UE capabilities according to other embodiments.

Solution C works as illustrated in FIG. 18. The gNB triggers the capability information request over RRC and the response is provided by the UE over NAS.

This solution splits the capability transfer procedures between AS (RRC) and NAS layers. In this solution, transmission of information over the NAS protocol layer is secure whereas transmission of information over the AS protocol layer is not secure. A merit of this solution is that a request may be sent over an unsecure connection (in the example embodiment, the AS/RRC protocol layer), but the response, including the requested information is sent over a secure connection (in the example embodiment, the NAS protocol layer). It means that this solution enables support for functionality that requires properties of the protocol layer that are not available on the requesting protocol layer, but that are supported on another protocol layer. More description follows.

Current protocol architecture limits the communication, more specifically, the response to e.g. a request message on a particular protocol layer, e.g. RRC, to the possibility to reply to that request on the same protocol layer. This imposes limitations with regards to the functionalities that can be introduced into a system that is built on that principle. A functional example of such limitation is the capability transfer procedure. The lack of security in AS layer could not benefit from the presence of security in NAS layer. Now, this solution introduces a new protocol architectural principle enabling a response to a request on protocol layer-x to be provided on protocol layer-y. In the example showing the solution, this means that a request for UE Radio Capability information sent by the gNB on the RRC layer to the UE is responded to by the UE on the NAS layer where Security measure are enabled, i.e. so called NAS Security is enabled, see 3GPP TS 23.501v16.3.0. Also see 3GPP TS 33.501 v15.6.0 for security aspects related to AS and NAS.

In other words, the solution works as follows. The network handling Access Stratum (e.g., NG-RAN in 5G which could be gNB or ng-eNG) is transmitting a request to the UE on the RRC protocol layer, requesting the UE to respond to the network with UE Radio Capability Information. This request for Capability information can be an already-specified CapabilityEnquiry message, as described already in RRC specification, e.g. TS 38.331 or 36.331. It can also be a new message. In either case, the NG-RAN provides an indication of what kind/part of capabilities it is requesting from the UE.

In response to the CapabilityEnquiry Message sent from the NG-RAN node to the UE on the RRC layer, the UE will assemble requested capability information or use static pre-assembled capability information and respond to the network. But instead of sending the response on the RRC layer, the response will be sent on the NAS layer, the Non-Access Stratum Layer. The response will thus be received in the AMF. Although the information is transferred or tunneled via NG-RAN, the information is intended for the AMF. When the information is encrypted by the UE for the AMF, then only the AMF, and not the NG-RAN, has necessary security keys to decrypt the information. The AMF may then store the information in connection to the UE context and it may also forward the information to the NG-RAN node, via the interface between the AMF and the NG-RAN node, usually referred to as the N2- or NG interface. The NG-RAN node may thus receive the requested capability information, but it would be received on a different interface than it was requested.

In some embodiments, the concept of binding as described above is used in this solution too, for example by the UE sending at least some parts of the RRC UE CapabilityEnquiry message or a hash over RRC UE CapabilityEnquiry message to the AMF when sending the UE CapabilityInformation.

Note here that Solution C exemplifies the embodiments illustrated in FIG. 5 and FIGS. 6-8.

Figure 19:
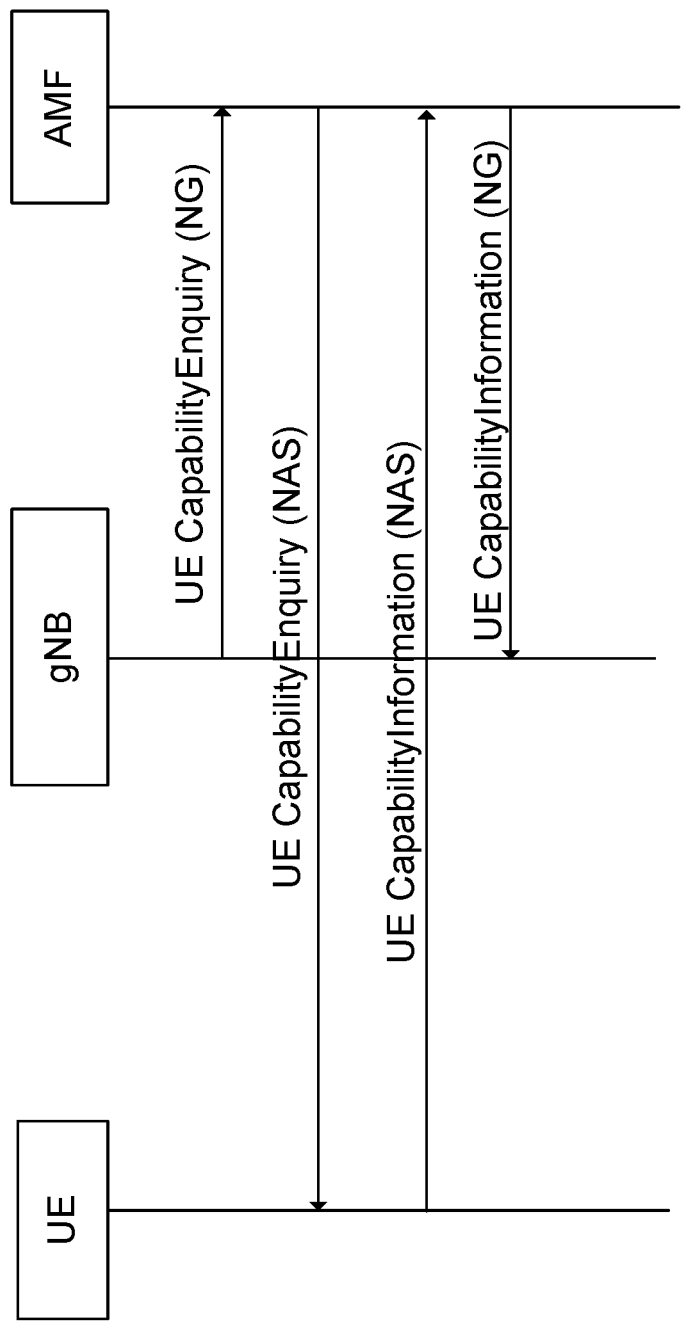
FIG. 19 is a call flow diagram of a procedure for protecting the transfer of UE capabilities according to other embodiments.

Solution D works as illustrated in FIG. 19. In this case, the gNB initiates a request for Capability Information, but a trigger is sent to the AMF which forwards or creates a request to send over the NAS protocol layer. The UE responds over NAS and the gNB gets the capability information from the AMF over NG.

In this Solution D, the NG-RAN node would request capability information via the AMF. In case the AMF does not have any capability information as requested for a certain UE, the AMF would request information from the UE over the NAS protocol layer, i.e., the N1 interface between the UE and the AMF. The request over NAS may be constructed in such a way that the AMF simply forwards the request for capability information that is originating from the NG-RAN node, or the request to the UE may alternatively be constructed by the AMF itself. In the former case, the AMF may "transparently" forward the request to the UE from the NG-RAN node, or it may construct the request "based on information" from the request by NG-RAN node. In this solution, the UE would respond to the request over the NAS protocol layer, directly to the AMF and then the AMF would forward the response over the NG-interface to the NG-RAN node.

The triggers for solution C and D can be at least one of the following: (i) gNB initiates a request to the UE at reception of RRC messages from the UE, like RRCSetupRequest, RRCSetupComplete, etc; (ii) for either Solution C or Solution D, the gNB initiates a request to the UE at reception of an initial Context Setup Request message from the AMF, after detecting that the message does not include adequate Capability Information; (iii) for Solution D, the AMF initiates the procedure after having received the Initial UE message+CapabilityEnquiry indication from gNB.

Figure 20:
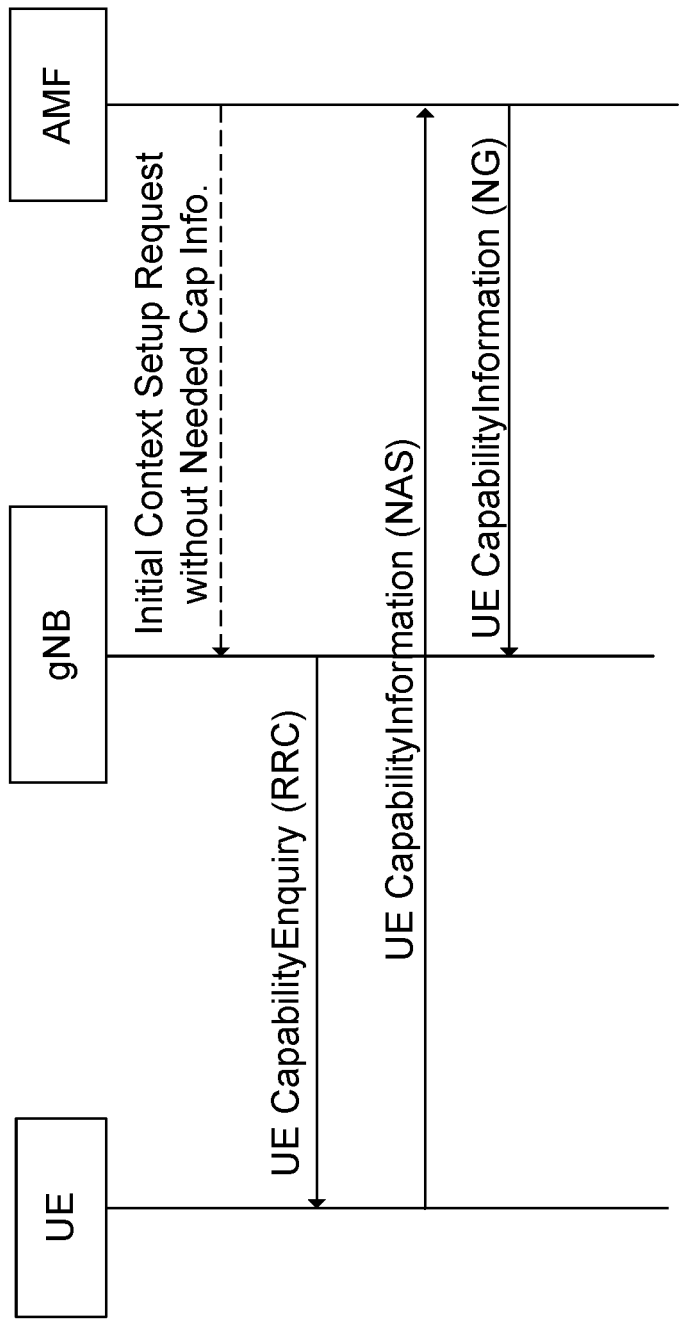
FIG. 20 is a call flow diagram of a procedure for protecting the transfer of UE capabilities according to other embodiments.
Figure 21:
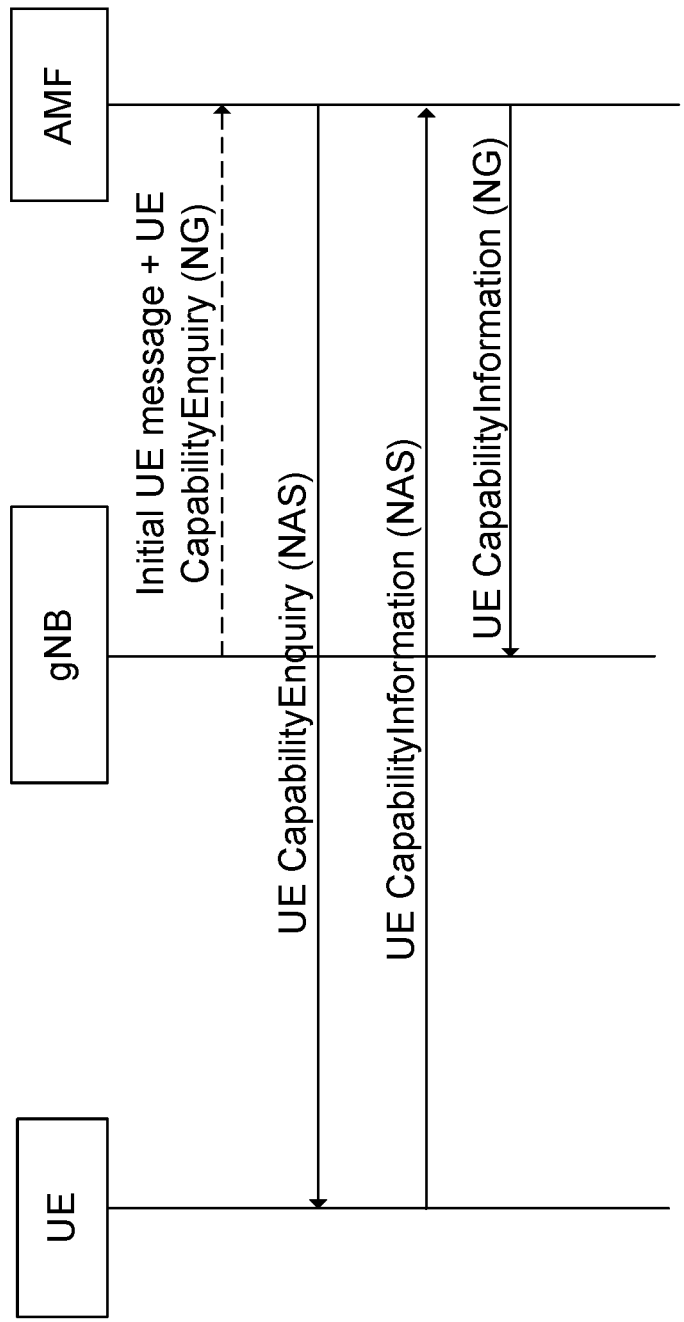
FIG. 21 is a call flow diagram of a procedure for protecting the transfer of UE capabilities according to other embodiments.

For example, the trigger of Solution C can be as illustrated in FIG. 20. In this case, the solution is triggered by reception of an Initial Context Setup Request without the needed capability information. As another example, the trigger of Solution D can be as illustrated in FIG. 21. The signaling sequence and retrieval of capability information is triggered together with the initial UE message, transferred from the gNB to the AMF. In this case, the AMF triggers the capability enquiry at reception of the initial UE message.

Other triggers are of course also possible. The AMF may for example, prior to transmission of the initial context setup request message and in situations when there is no capability information available, execute the NAS procedure without any preceding indication from the gNB. In such a situation, the AMF would be pre-configured with the content of a request, and there is no need for a specific gNB to indicate, for every UE request, what information should be requested. This means that prior to sending the context setup request message from the AMF, the AMF makes sure it includes capability information. This is illustrated in FIG. 22.

Figure 22:
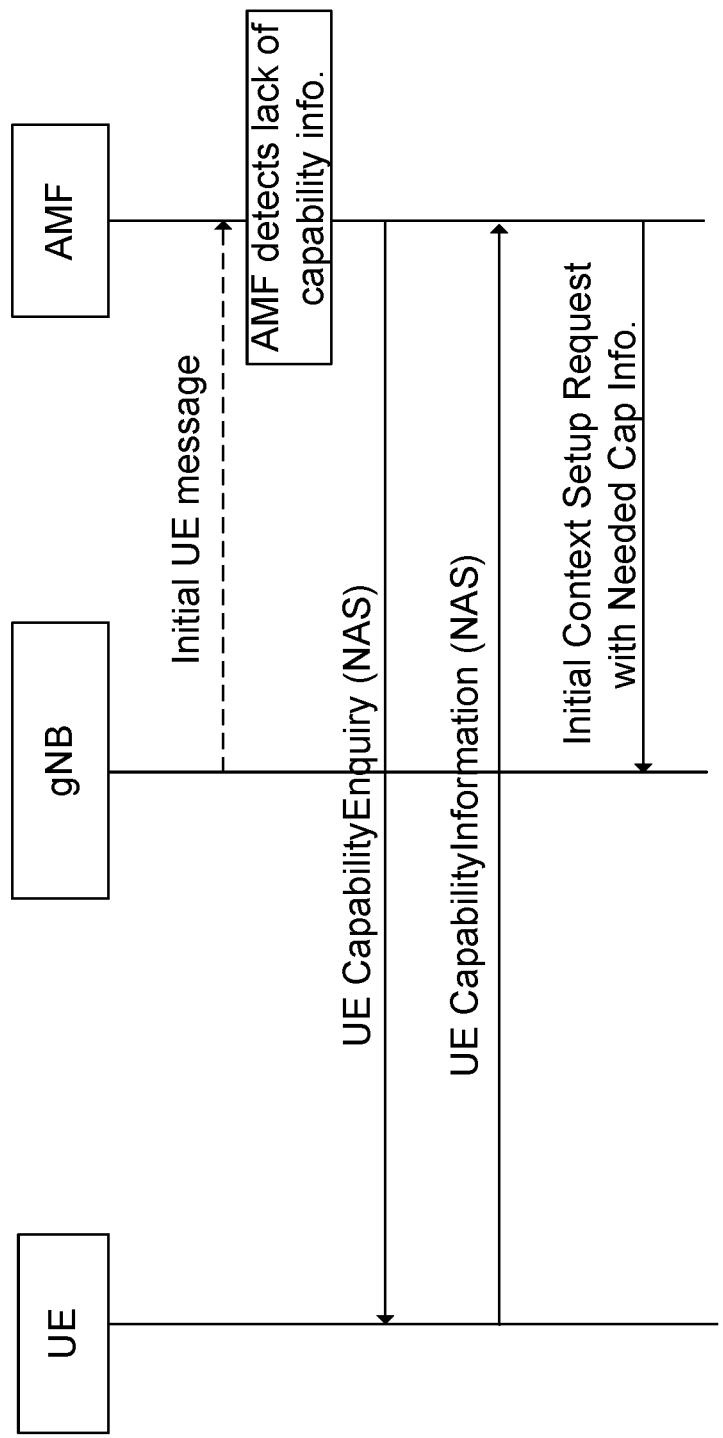
FIG. 22 is a call flow diagram of a procedure for protecting the transfer of UE capabilities according to other embodiments.

Here, in FIG. 22, the AMF detects lack of Capability information and request thereof prior to sending the initial Context Setup Request Message. Typically, the request/enquiry message could be pre-configured and valid for relevant the gNB/Cell.

Figure 23A:
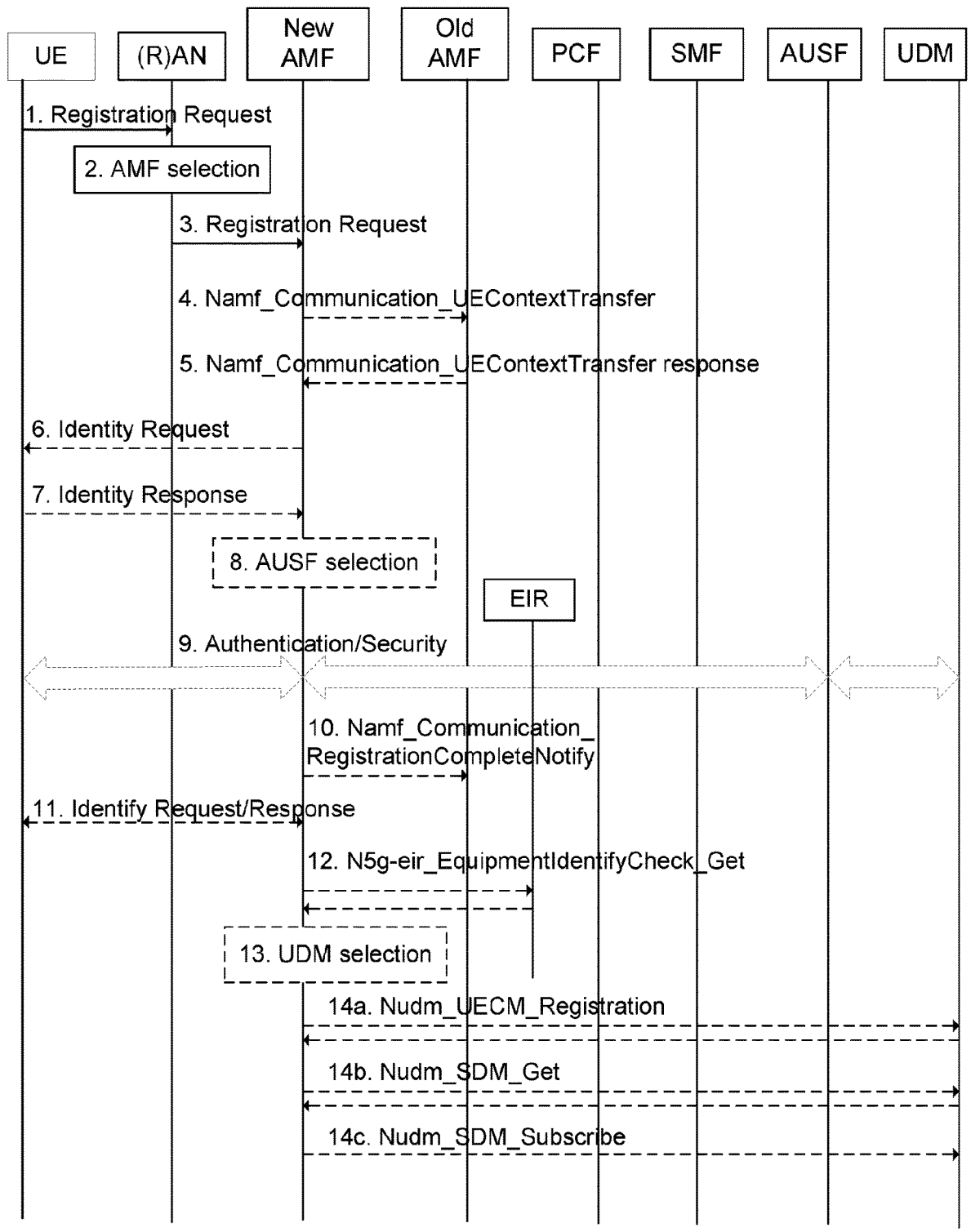
FIGS. 23A and 23B are call flow diagrams of a procedure for protecting the transfer of UE capabilities according to some embodiments.
Figure 23B:
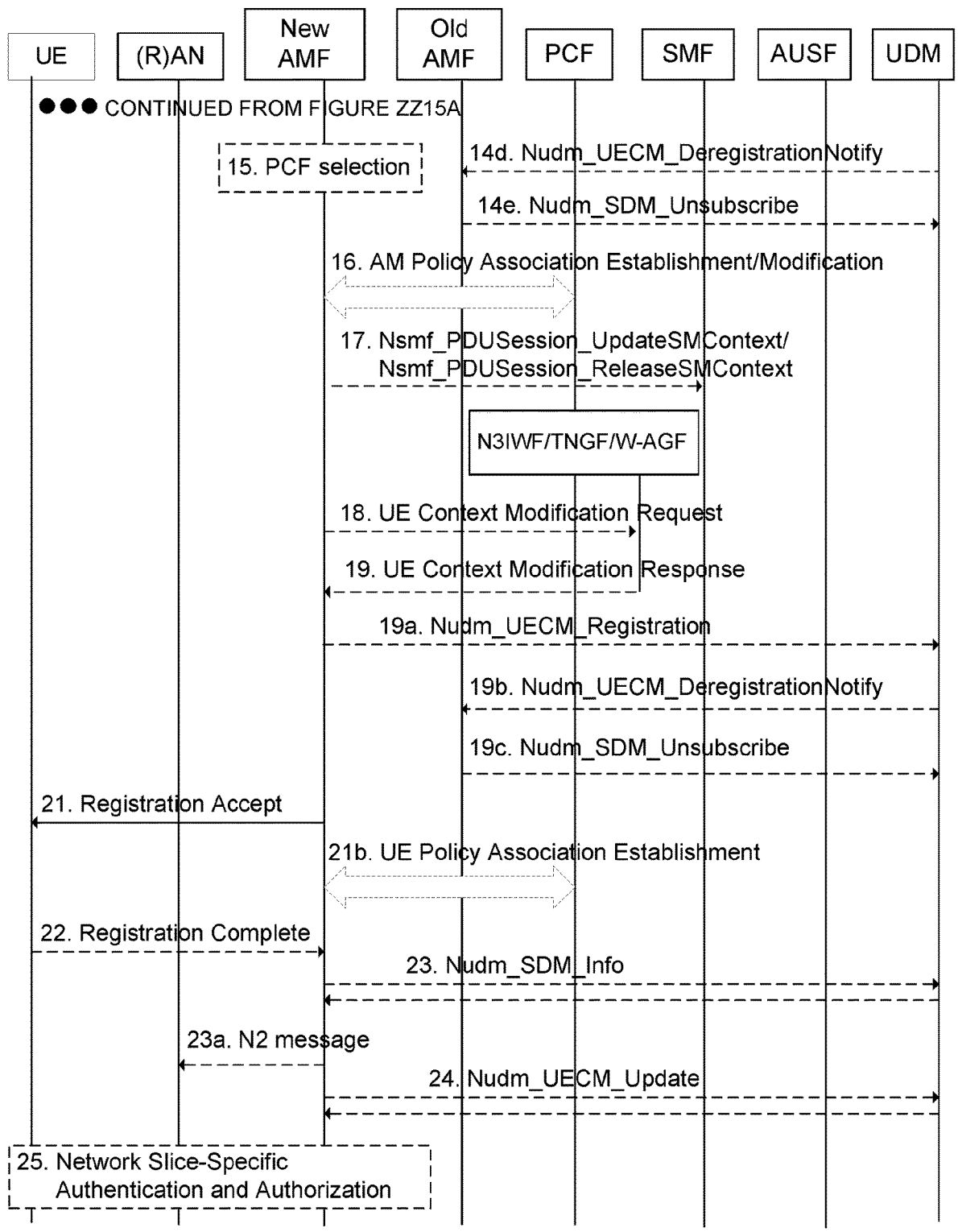

One example of solution C is exemplified in the registration procedure shown in FIGS. 23A and 23B (see 3GPP TS 23.502v16.3.0) during which the UE Radio Capability information is transferred from the UE to the network.

Steps 1-9a are the same as described in 3GPP TS 23.502v16.3.0.

9b If NAS security context does not exist, the NAS security initiation is performed as described in TS 33.501. If the UE had no NAS security context in step 1, the UE includes the full Registration Request message as defined in TS 24.501.

The AMF decides if the Registration Request needs to be rerouted as described in clause 4.2.2.2.3, where the initial AMF refers to the AMF.

Note here that Step 9b introduces security on the NAS layer.

Notably, according to some embodiments, subsequent to step 9b, i.e. once NAS security has been setup, NG-RAN may request UE Radio Access Capability information over RRC layer indicating to the UE that the response shall be provided in the NAS layer.

9c. The AMF initiates NG Application Protocol (NGAP) procedure to provide the 5G-AN with security context as specified in TS 38.413 if the 5G-AN had requested for UE Context.

9d. The 5G-AN stores the security context and acknowledges to the AMF. The 5G-AN uses the security context to protect the messages exchanged with the UE as described in TS 33.501.

Note that when CP CIoT Optimisation is used, steps 9c and 9d, that introduce security in 5G-AN, are not applicable.

Steps 10-21 are the same as described in 3GPP TS 23.502v16.3.0.

Notably, in the NGAP message, AMF indicates to NG-RAN that NAS security is enabled. Alternatively, this indication may be provided in any NGAP message subsequent to step 9, once NAS security has been successfully enabled, i.e. it can be a new standalone message on NGAP.

21b. [Optional] The new AMF performs a UE Policy Association Establishment.

Notably, the UE includes UE Radio Capability information as a new Information Element. AMF stores it and provides to NG-RAN in the relevant procedures, e.g., when requested by NG-RAN or when new NGAP message is sent to NG-RAN. Alternatively, any UE can include UE Radio Access Capability information in any potential NAS message subsequent to the request received from the NG-RAN and when NAS security has been successfully enabled.

Step 22 to rest are the same as described in 3GPP TS 23.502v16.3.0.

Figure 24:
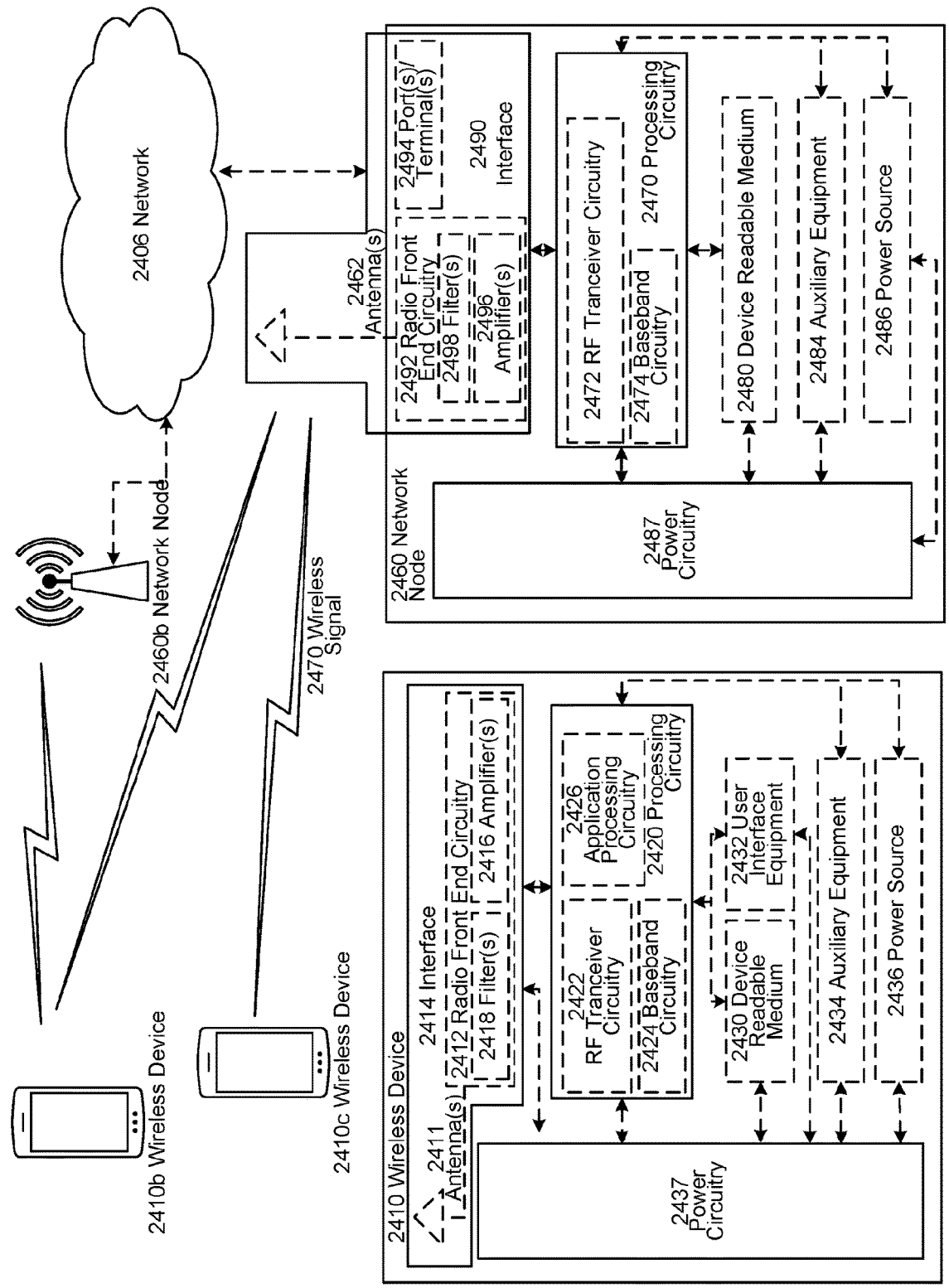
FIG. 24 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 24. For simplicity, the wireless network of FIG. 24 only depicts network 2406, network nodes 2460 and 2460*b*, and WDs 2410, 2410*b*, and 2410*c*. In practice, a wireless network may further include any additional elements suitable to support communication between wireless devices or between a wireless device and another communication device, such as a landline telephone, a service provider, or any other network node or end device. Of the illustrated components, network node 2460 and wireless device (WD) 2410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2460 and WD 2410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 24, network node 2460 includes processing circuitry 2470, device readable medium 2480, interface 2490, auxiliary equipment 2484, power source 2486, power circuitry 2487, and antenna 2462. Although network node 2460 illustrated in the example wireless network of FIG. 24 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2460 are depicted as single boxes located within a larger box, or nested within multiple boxes, in practice, a network node may comprise multiple different physical components that make up a single illustrated component (e.g., device readable medium 2480 may comprise multiple separate hard drives as well as multiple RAM modules).

Similarly, network node 2460 may be composed of multiple physically separate components (e.g., a NodeB component and a RNC component, or a BTS component and a BSC component, etc.), which may each have their own respective components. In certain scenarios in which network node 2460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2460 may be configured to support multiple radio access technologies (RATs). In such embodiments, some components may be duplicated (e.g., separate device readable medium 2480 for the different RATs) and some components may be reused (e.g., the same antenna 2462 may be shared by the RATs). Network node 2460 may also include multiple sets of the various illustrated components for different wireless technologies integrated into network node 2460, such as, for example, GSM, WCDMA, LTE, NR, WiFi, or Bluetooth wireless technologies. These wireless technologies may be integrated into the same or different chip or set of chips and other components within network node 2460.

Processing circuitry 2470 is configured to perform any determining, calculating, or similar operations (e.g., certain obtaining operations) described herein as being provided by a network node. These operations performed by processing circuitry 2470 may include processing information obtained by processing circuitry 2470 by, for example, converting the obtained information into other information, comparing the obtained information or converted information to information stored in the network node, and/or performing one or more operations based on the obtained information or converted information, and as a result of said processing making a determination.

Processing circuitry 2470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2460 components, such as device readable medium 2480, network node 2460 functionality. For example, processing circuitry 2470 may execute instructions stored in device readable medium 2480 or in memory within processing circuitry 2470. Such functionality may include providing any of the various wireless features, functions, or benefits discussed herein. In some embodiments, processing circuitry 2470 may include a system on a chip (SOC).

In some embodiments, processing circuitry 2470 may include one or more of radio frequency (RF) transceiver circuitry 2472 and baseband processing circuitry 2474. In some embodiments, radio frequency (RF) transceiver circuitry 2472 and baseband processing circuitry 2474 may be on separate chips (or sets of chips), boards, or units, such as radio units and digital units. In alternative embodiments, part or all of RF transceiver circuitry 2472 and baseband processing circuitry 2474 may be on the same chip or set of chips, boards, or units In certain embodiments, some or all of the functionality described herein as being provided by a network node, base station, eNB or other such network device may be performed by processing circuitry 2470 executing instructions stored on device readable medium 2480 or memory within processing circuitry 2470. In alternative embodiments, some or all of the functionality may be provided by processing circuitry 2470 without executing instructions stored on a separate or discrete device readable medium, such as in a hard-wired manner. In any of those embodiments, whether executing instructions stored on a device readable storage medium or not, processing circuitry 2470 can be configured to perform the described functionality. The benefits provided by such functionality are not limited to processing circuitry 2470 alone or to other components of network node 2460, but are enjoyed by network node 2460 as a whole, and/or by end users and the wireless network generally.

Device readable medium 2480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2470. Device readable medium 2480 may store any suitable instructions, data or information, including a computer program, software, an application including one or more of logic, rules, code, tables, etc. and/or other instructions capable of being executed by processing circuitry 2470 and, utilized by network node 2460. Device readable medium 2480 may be used to store any calculations made by processing circuitry 2470 and/or any data received via interface 2490. In some embodiments, processing circuitry 2470 and device readable medium 2480 may be considered to be integrated.

Interface 2490 is used in the wired or wireless communication of signalling and/or data between network node 2460, network 2406, and/or WDs 2410. As illustrated, interface 2490 comprises port(s)/terminal(s) 2494 to send and receive data, for example to and from network 2406 over a wired connection. Interface 2490 also includes radio front end circuitry 2492 that may be coupled to, or in certain embodiments a part of, antenna 2462. Radio front end circuitry 2492 comprises filters 2498 and amplifiers 2496. Radio front end circuitry 2492 may be connected to antenna 2462 and processing circuitry 2470. Radio front end circuitry may be configured to condition signals communicated between antenna 2462 and processing circuitry 2470. Radio front end circuitry 2492 may receive digital data that is to be sent out to other network nodes or WDs via a wireless connection. Radio front end circuitry 2492 may convert the digital data into a radio signal having the appropriate channel and bandwidth parameters using a combination of filters 2498 and/or amplifiers 2496. The radio signal may then be transmitted via antenna 2462. Similarly, when receiving data, antenna 2462 may collect radio signals which are then converted into digital data by radio front end circuitry 2492. The digital data may be passed to processing circuitry 2470. In other embodiments, the interface may comprise different components and/or different combinations of components.

In certain alternative embodiments, network node 2460 may not include separate radio front end circuitry 2492, instead, processing circuitry 2470 may comprise radio front end circuitry and may be connected to antenna 2462 without separate radio front end circuitry 2492. Similarly, in some embodiments, all or some of RF transceiver circuitry 2472 may be considered a part of interface 2490. In still other embodiments, interface 2490 may include one or more ports or terminals 2494, radio front end circuitry 2492, and RF transceiver circuitry 2472, as part of a radio unit (not shown), and interface 2490 may communicate with baseband processing circuitry 2474, which is part of a digital unit (not shown).

Antenna 2462 may include one or more antennas, or antenna arrays, configured to send and/or receive wireless signals. Antenna 2462 may be coupled to radio front end circuitry 2490 and may be any type of antenna capable of transmitting and receiving data and/or signals wirelessly. In some embodiments, antenna 2462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2462 may be separate from network node 2460 and may be connectable to network node 2460 through an interface or port.

Antenna 2462, interface 2490, and/or processing circuitry 2470 may be configured to perform any receiving operations and/or certain obtaining operations described herein as being performed by a network node. Any information, data and/or signals may be received from a wireless device, another network node and/or any other network equipment. Similarly, antenna 2462, interface 2490, and/or processing circuitry 2470 may be configured to perform any transmitting operations described herein as being performed by a network node. Any information, data and/or signals may be transmitted to a wireless device, another network node and/or any other network equipment.

Power circuitry 2487 may comprise, or be coupled to, power management circuitry and is configured to supply the components of network node 2460 with power for performing the functionality described herein. Power circuitry 2487 may receive power from power source 2486. Power source 2486 and/or power circuitry 2487 may be configured to provide power to the various components of network node 2460 in a form suitable for the respective components (e.g., at a voltage and current level needed for each respective component). Power source 2486 may either be included in, or external to, power circuitry 2487 and/or network node 2460. For example, network node 2460 may be connectable to an external power source (e.g., an electricity outlet) via an input circuitry or interface such as an electrical cable, whereby the external power source supplies power to power circuitry 2487. As a further example, power source 2486 may comprise a source of power in the form of a battery or battery pack which is connected to, or integrated in, power circuitry 2487. The battery may provide backup power should the external power source fail. Other types of power sources, such as photovoltaic devices, may also be used.

Alternative embodiments of network node 2460 may include additional components beyond those shown in FIG. 24 that may be responsible for providing certain aspects of the network node's functionality, including any of the functionality described herein and/or any functionality necessary to support the subject matter described herein. For example, network node 2460 may include user interface equipment to allow input of information into network node 2460 and to allow output of information from network node 2460. This may allow a user to perform diagnostic, maintenance, repair, and other administrative functions for network node 2460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2410 includes antenna 2411, interface 2414, processing circuitry 2420, device readable medium 2430, user interface equipment 2432, auxiliary equipment 2434, power source 2436 and power circuitry 2437. WD 2410 may include multiple sets of one or more of the illustrated components for different wireless technologies supported by WD 2410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2410.

Antenna 2411 may include one or more antennas or antenna arrays, configured to send and/or receive wireless signals, and is connected to interface 2414. In certain alternative embodiments, antenna 2411 may be separate from WD 2410 and be connectable to WD 2410 through an interface or port. Antenna 2411, interface 2414, and/or processing circuitry 2420 may be configured to perform any receiving or transmitting operations described herein as being performed by a WD. Any information, data and/or signals may be received from a network node and/or another WD. In some embodiments, radio front end circuitry and/or antenna 2411 may be considered an interface.

As illustrated, interface 2414 comprises radio front end circuitry 2412 and antenna 2411. Radio front end circuitry 2412 comprise one or more filters 2418 and amplifiers 2416. Radio front end circuitry 2414 is connected to antenna 2411 and processing circuitry 2420, and is configured to condition signals communicated between antenna 2411 and processing circuitry 2420. Radio front end circuitry 2412 may be coupled to or a part of antenna 2411. In some embodiments, WD 2410 may not include separate radio front end circuitry 2412; rather, processing circuitry 2420 may comprise radio front end circuitry and may be connected to antenna 2411. Similarly, in some embodiments, some or all of RF transceiver circuitry 2422 may be considered a part of interface 2414. Radio front end circuitry 2412 may receive digital data that is to be sent out to other network nodes or WDs via a wireless connection. Radio front end circuitry 2412 may convert the digital data into a radio signal having the appropriate channel and bandwidth parameters using a combination of filters 2418 and/or amplifiers 2416. The radio signal may then be transmitted via antenna 2411. Similarly, when receiving data, antenna 2411 may collect radio signals which are then converted into digital data by radio front end circuitry 2412. The digital data may be passed to processing circuitry 2420. In other embodiments, the interface may comprise different components and/or different combinations of components.

Processing circuitry 2420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2410 components, such as device readable medium 2430, WD 2410 functionality. Such functionality may include providing any of the various wireless features or benefits discussed herein. For example, processing circuitry 2420 may execute instructions stored in device readable medium 2430 or in memory within processing circuitry 2420 to provide the functionality disclosed herein.

As illustrated, processing circuitry 2420 includes one or more of RF transceiver circuitry 2422, baseband processing circuitry 2424, and application processing circuitry 2426. In other embodiments, the processing circuitry may comprise different components and/or different combinations of components. In certain embodiments processing circuitry 2420 of WD 2410 may comprise a SOC. In some embodiments, RF transceiver circuitry 2422, baseband processing circuitry 2424, and application processing circuitry 2426 may be on separate chips or sets of chips. In alternative embodiments, part or all of baseband processing circuitry 2424 and application processing circuitry 2426 may be combined into one chip or set of chips, and RF transceiver circuitry 2422 may be on a separate chip or set of chips. In still alternative embodiments, part or all of RF transceiver circuitry 2422 and baseband processing circuitry 2424 may be on the same chip or set of chips, and application processing circuitry 2426 may be on a separate chip or set of chips. In yet other alternative embodiments, part or all of RF transceiver circuitry 2422, baseband processing circuitry 2424, and application processing circuitry 2426 may be combined in the same chip or set of chips. In some embodiments, RF transceiver circuitry 2422 may be a part of interface 2414. RF transceiver circuitry 2422 may condition RF signals for processing circuitry 2420.

In certain embodiments, some or all of the functionality described herein as being performed by a WD may be provided by processing circuitry 2420 executing instructions stored on device readable medium 2430, which in certain embodiments may be a computer-readable storage medium. In alternative embodiments, some or all of the functionality may be provided by processing circuitry 2420 without executing instructions stored on a separate or discrete device readable storage medium, such as in a hard-wired manner. In any of those particular embodiments, whether executing instructions stored on a device readable storage medium or not, processing circuitry 2420 can be configured to perform the described functionality. The benefits provided by such functionality are not limited to processing circuitry 2420 alone or to other components of WD 2410, but are enjoyed by WD 2410 as a whole, and/or by end users and the wireless network generally.

Processing circuitry 2420 may be configured to perform any determining, calculating, or similar operations (e.g., certain obtaining operations) described herein as being performed by a WD. These operations, as performed by processing circuitry 2420, may include processing information obtained by processing circuitry 2420 by, for example, converting the obtained information into other information, comparing the obtained information or converted information to information stored by WD 2410, and/or performing one or more operations based on the obtained information or converted information, and as a result of said processing making a determination.

Device readable medium 2430 may be operable to store a computer program, software, an application including one or more of logic, rules, code, tables, etc. and/or other instructions capable of being executed by processing circuitry 2420. Device readable medium 2430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2420. In some embodiments, processing circuitry 2420 and device readable medium 2430 may be considered to be integrated.

User interface equipment 2432 may provide components that allow for a human user to interact with WD 2410. Such interaction may be of many forms, such as visual, audial, tactile, etc. User interface equipment 2432 may be operable to produce output to the user and to allow the user to provide input to WD 2410. The type of interaction may vary depending on the type of user interface equipment 2432 installed in WD 2410. For example, if WD 2410 is a smart phone, the interaction may be via a touch screen; if WD 2410 is a smart meter, the interaction may be through a screen that provides usage (e.g., the number of gallons used) or a speaker that provides an audible alert (e.g., if smoke is detected). User interface equipment 2432 may include input interfaces, devices and circuits, and output interfaces, devices and circuits. User interface equipment 2432 is configured to allow input of information into WD 2410, and is connected to processing circuitry 2420 to allow processing circuitry 2420 to process the input information. User interface equipment 2432 may include, for example, a microphone, a proximity or other sensor, keys/buttons, a touch display, one or more cameras, a USB port, or other input circuitry. User interface equipment 2432 is also configured to allow output of information from WD 2410, and to allow processing circuitry 2420 to output information from WD 2410. User interface equipment 2432 may include, for example, a speaker, a display, vibrating circuitry, a USB port, a headphone interface, or other output circuitry. Using one or more input and output interfaces, devices, and circuits, of user interface equipment 2432, WD 2410 may communicate with end users and/or the wireless network, and allow them to benefit from the functionality described herein.

Auxiliary equipment 2434 is operable to provide more specific functionality which may not be generally performed by WDs. This may comprise specialized sensors for doing measurements for various purposes, interfaces for additional types of communication such as wired communications etc. The inclusion and type of components of auxiliary equipment 2434 may vary depending on the embodiment and/or scenario.

Power source 2436 may, in some embodiments, be in the form of a battery or battery pack. Other types of power sources, such as an external power source (e.g., an electricity outlet), photovoltaic devices or power cells, may also be used. WD 2410 may further comprise power circuitry 2437 for delivering power from power source 2436 to the various parts of WD 2410 which need power from power source 2436 to carry out any functionality described or indicated herein. Power circuitry 2437 may in certain embodiments comprise power management circuitry. Power circuitry 2437 may additionally or alternatively be operable to receive power from an external power source; in which case WD 2410 may be connectable to the external power source (such as an electricity outlet) via input circuitry or an interface such as an electrical power cable. Power circuitry 2437 may also in certain embodiments be operable to deliver power from an external power source to power source 2436. This may be, for example, for the charging of power source 2436. Power circuitry 2437 may perform any formatting, converting, or other modification to the power from power source 2436 to make the power suitable for the respective components of WD 2410 to which power is supplied.

Figure 25:
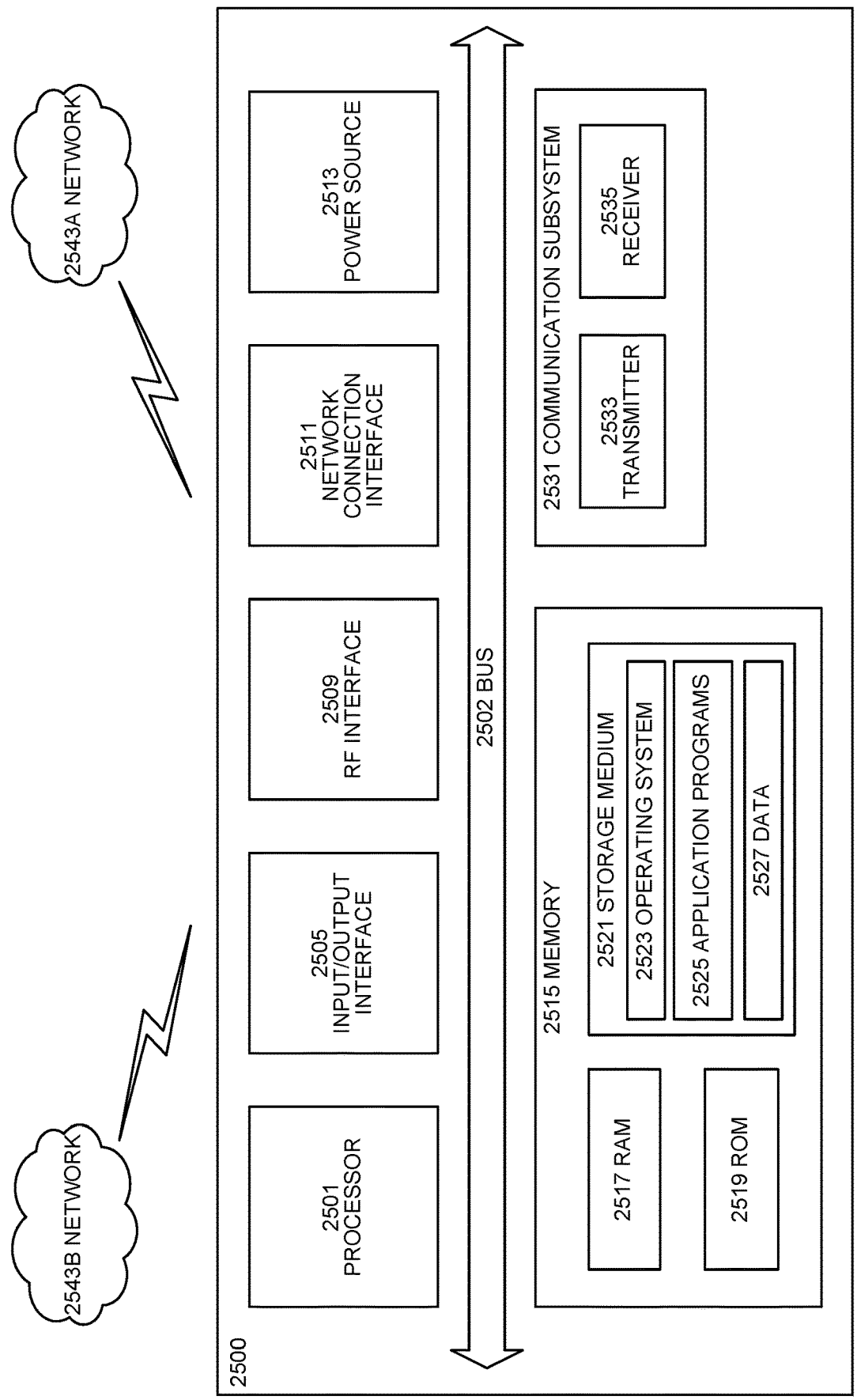
FIG. 25 is a block diagram of a user equipment according to some embodiments.

FIG. 25 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 25200 may be any UE identified by the $3^{rd}$ Generation Partnership Project (3GPP), including a NB-IoT UE, a machine type communication (MTC) UE, and/or an enhanced MTC (eMTC) UE. UE 2500, as illustrated in FIG. 25, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 25 is a UE, the components discussed herein are equally applicable to a WD, and vice-versa.

In FIG. 25, UE 2500 includes processing circuitry 2501 that is operatively coupled to input/output interface 2505, radio frequency (RF) interface 2509, network connection interface 2511, memory 2515 including random access memory (RAM) 2517, read-only memory (ROM) 2519, and storage medium 2521 or the like, communication subsystem 2531, power source 2533, and/or any other component, or any combination thereof. Storage medium 2521 includes operating system 2523, application program 2525, and data 2527. In other embodiments, storage medium 2521 may include other similar types of information. Certain UEs may utilize all of the components shown in FIG. 25, or only a subset of the components. The level of integration between the components may vary from one UE to another UE. Further, certain UEs may contain multiple instances of a component, such as multiple processors, memories, transceivers, transmitters, receivers, etc.

In FIG. 25, processing circuitry 2501 may be configured to process computer instructions and data. Processing circuitry 2501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2501 may include two central processing units (CPUs). Data may be information in a form suitable for use by a computer.

In the depicted embodiment, input/output interface 2505 may be configured to provide a communication interface to an input device, output device, or input and output device. UE 2500 may be configured to use an output device via input/output interface 2505. An output device may use the same type of interface port as an input device. For example, a USB port may be used to provide input to and output from UE 2500. The output device may be a speaker, a sound card, a video card, a display, a monitor, a printer, an actuator, an emitter, a smartcard, another output device, or any combination thereof. UE 2500 may be configured to use an input device via input/output interface 2505 to allow a user to capture information into UE 2500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 25, RF interface 2509 may be configured to provide a communication interface to RF components such as a transmitter, a receiver, and an antenna. Network connection interface 2511 may be configured to provide a communication interface to network 2543*a*. Network 2543*a* may encompass wired and/or wireless networks such as a local-area network (LAN), a wide-area network (WAN), a computer network, a wireless network, a telecommunications network, another like network or any combination thereof. For example, network 2543*a* may comprise a Wi-Fi network. Network connection interface 2511 may be configured to include a receiver and a transmitter interface used to communicate with one or more other devices over a communication network according to one or more communication protocols, such as Ethernet, TCP/IP, SONET, ATM, or the like. Network connection interface 2511 may implement receiver and transmitter functionality appropriate to the communication network links (e.g., optical, electrical, and the like). The transmitter and receiver functions may share circuit components, software or firmware, or alternatively may be implemented separately.

RAM 2517 may be configured to interface via bus 2502 to processing circuitry 2501 to provide storage or caching of data or computer instructions during the execution of software programs such as the operating system, application programs, and device drivers. ROM 2519 may be configured to provide computer instructions or data to processing circuitry 2501. For example, ROM 2519 may be configured to store invariant low-level system code or data for basic system functions such as basic input and output (I/O), startup, or reception of keystrokes from a keyboard that are stored in a non-volatile memory. Storage medium 2521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2521 may be configured to include operating system 2523, application program 2525 such as a web browser application, a widget or gadget engine or another application, and data file 2527. Storage medium 2521 may store, for use by UE 2500, any of a variety of various operating systems or combinations of operating systems.

Storage medium 2521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2521 may allow UE 2500 to access computer-executable instructions, application programs or the like, stored on transitory or non-transitory memory media, to off-load data, or to upload data. An article of manufacture, such as one utilizing a communication system may be tangibly embodied in storage medium 2521, which may comprise a device readable medium.

In FIG. 25, processing circuitry 2501 may be configured to communicate with network 2543*b* using communication subsystem 2531. Network 2543*a* and network 2543*b* may be the same network or networks or different network or networks. Communication subsystem 2531 may be configured to include one or more transceivers used to communicate with network 2543*b*. For example, communication subsystem 2531 may be configured to include one or more transceivers used to communicate with one or more remote transceivers of another device capable of wireless communication such as another WD, UE, or base station of a radio access network (RAN) according to one or more communication protocols, such as IEEE 802.25, CDMA, WCDMA, GSM, LTE, UTRAN, WiMax, or the like. Each transceiver may include transmitter 2533 and/or receiver 2535 to implement transmitter or receiver functionality, respectively, appropriate to the RAN links (e.g., frequency allocations and the like). Further, transmitter 2533 and receiver 2535 of each transceiver may share circuit components, software or firmware, or alternatively may be implemented separately.

In the illustrated embodiment, the communication functions of communication subsystem 2531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2531 may include cellular communication, Wi-Fi communication, Bluetooth communication, and GPS communication. Network 2543*b* may encompass wired and/or wireless networks such as a local-area network (LAN), a wide-area network (WAN), a computer network, a wireless network, a telecommunications network, another like network or any combination thereof. For example, network 2543*b* may be a cellular network, a Wi-Fi network, and/or a near-field network. Power source 2513 may be configured to provide alternating current (AC) or direct current (DC) power to components of UE 2500.

The features, benefits and/or functions described herein may be implemented in one of the components of UE 2500 or partitioned across multiple components of UE 2500. Further, the features, benefits, and/or functions described herein may be implemented in any combination of hardware, software or firmware. In one example, communication subsystem 2531 may be configured to include any of the components described herein. Further, processing circuitry 2501 may be configured to communicate with any of such components over bus 2502. In another example, any of such components may be represented by program instructions stored in memory that when executed by processing circuitry 2501 perform the corresponding functions described herein. In another example, the functionality of any of such components may be partitioned between processing circuitry 2501 and communication subsystem 2531. In another example, the non-computationally intensive functions of any of such components may be implemented in software or firmware and the computationally intensive functions may be implemented in hardware.

Figure 26:
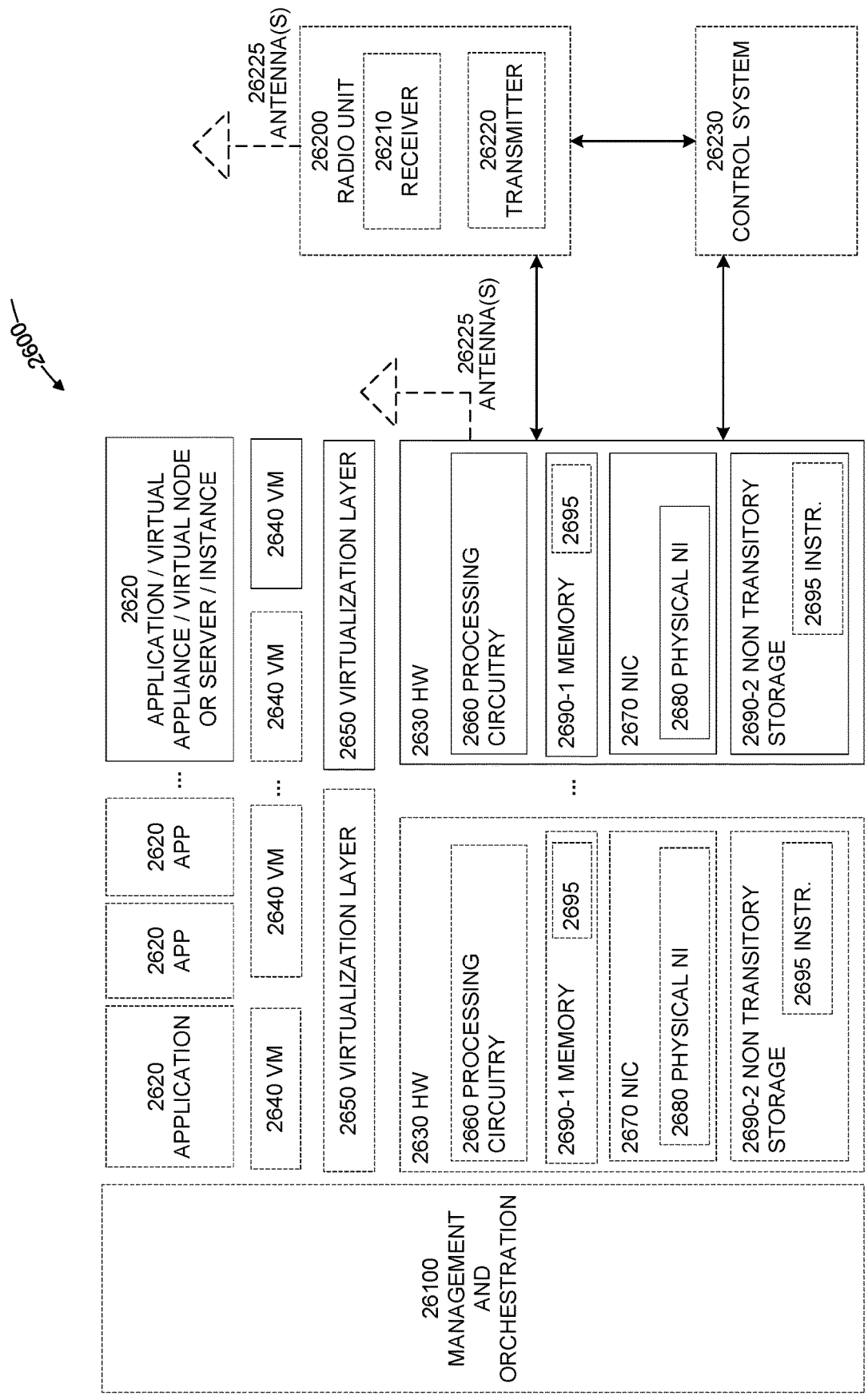
FIG. 26 is a block diagram of a virtualization environment according to some embodiments.

FIG. 26 is a schematic block diagram illustrating a virtualization environment 2600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node may be entirely virtualized.

The functions may be implemented by one or more applications 2620 (which may alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600, comprises general-purpose or special-purpose network hardware devices 2630 comprising a set of one or more processors or processing circuitry 2660, which may be commercial off-the-shelf (COTS) processors, dedicated Application Specific Integrated Circuits (ASICs), or any other type of processing circuitry including digital or analog hardware components or special purpose processors. Each hardware device may comprise memory 2690-1 which may be non-persistent memory for temporarily storing instructions 2695 or software executed by processing circuitry 2660. Each hardware device may comprise one or more network interface controllers (NICs) 2670, also known as network interface cards, which include physical network interface 2680. Each hardware device may also include non-transitory, persistent, machine-readable storage media 2690-2 having stored therein software 2695 and/or instructions executable by processing circuitry 2660. Software 2695 may include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and may be run by a corresponding virtualization layer 2650 or hypervisor. Different embodiments of the instance of virtual appliance 2620 may be implemented on one or more of virtual machines 2640, and the implementations may be made in different ways.

During operation, processing circuitry 2660 executes software 2695 to instantiate the hypervisor or virtualization layer 2650, which may sometimes be referred to as a virtual machine monitor (VMM). Virtualization layer 2650 may present a virtual operating platform that appears like networking hardware to virtual machine 2640.

As shown in FIG. 26, hardware 2630 may be a standalone network node with generic or specific components. Hardware 2630 may comprise antenna 26225 and may implement some functions via virtualization. Alternatively, hardware 2630 may be part of a larger cluster of hardware (e.g. such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2640 may be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 may be coupled to one or more antennas 26225. Radio units 26200 may communicate directly with hardware nodes 2630 via one or more appropriate network interfaces and may be used in combination with the virtual components to provide a virtual node with radio capabilities, such as a radio access node or a base station.

In some embodiments, some signalling can be effected with the use of control system 26230 which may alternatively be used for communication between the hardware nodes 2630 and radio units 26200.

Figure 27:
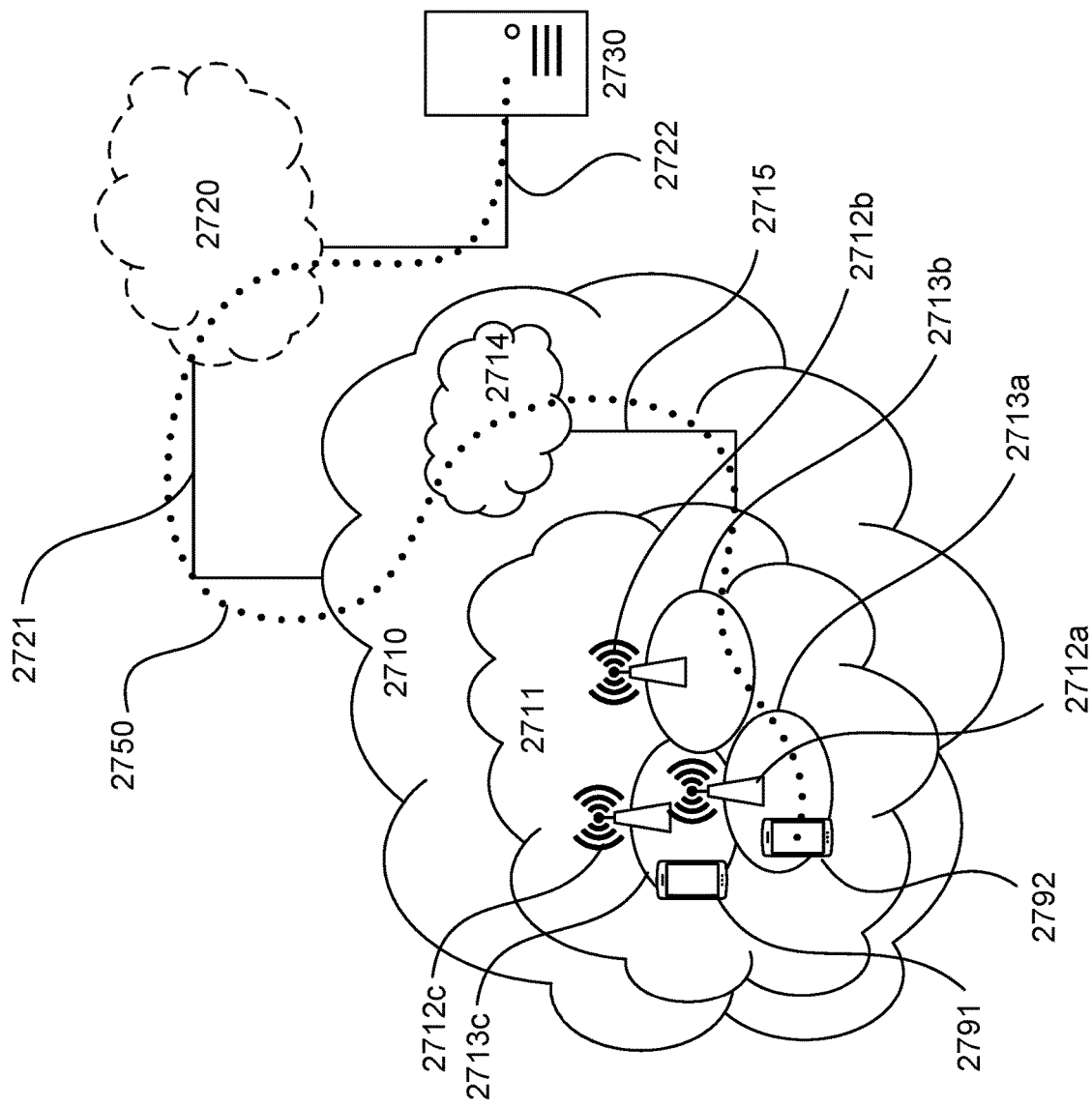
FIG. 27 is a block diagram of a communication network with a host computer according to some embodiments.

FIG. 27 illustrates a telecommunication network connected via an intermediate network to a host computer in accordance with some embodiments. In particular, with reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712a, 2712b, 2712c, such as NBs, eNBs, gNBs or other types of wireless access points, each defining a corresponding coverage area 2713a, 2713b, 2713c. Each base station 2712a, 2712b, 2712c is connectable to core network 2714 over a wired or wireless connection 2715. A first UE 2791 located in coverage area 2713c is configured to wirelessly connect to, or be paged by, the corresponding base station 2712c. A second UE 2792 in coverage area 2713a is wirelessly connectable to the corresponding base station 2712a. While a plurality of UEs 2791, 2792 are illustrated in this example, the disclosed embodiments are equally applicable to a situation where a sole UE is in the coverage area or where a sole UE is connecting to the corresponding base station 2712.

Telecommunication network 2710 is itself connected to host computer 2730, which may be embodied in the hardware and/or software of a standalone server, a cloud-implemented server, a distributed server or as processing resources in a server farm. Host computer 2730 may be under the ownership or control of a service provider, or may be operated by the service provider or on behalf of the service provider. Connections 2721 and 2722 between telecommunication network 2710 and host computer 2730 may extend directly from core network 2714 to host computer 2730 or may go via an optional intermediate network 2720. Intermediate network 2720 may be one of, or a combination of more than one of, a public, private or hosted network; intermediate network 2720, if any, may be a backbone network or the Internet; in particular, intermediate network 2720 may comprise two or more sub-networks (not shown).

The communication system of FIG. 27 as a whole enables connectivity between the connected UEs 2791, 2792 and host computer 2730. The connectivity may be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 may be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Figure 28:
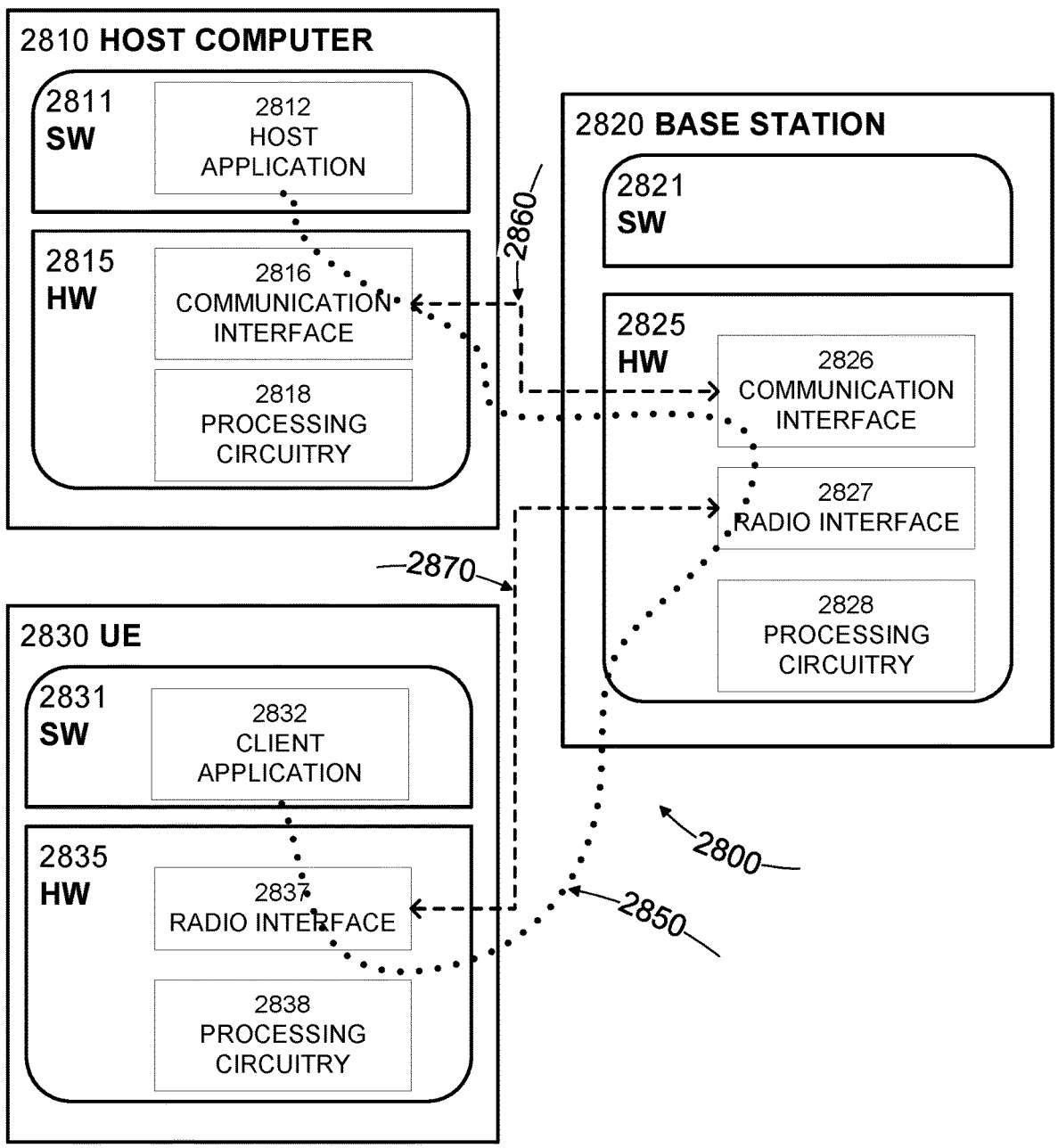
FIG. 28 is a block diagram of a host computer according to some embodiments.

Example implementations, in accordance with an embodiment, of the UE, base station and host computer discussed in the preceding paragraphs will now be described with reference to FIG. 28. FIG. 28 illustrates host computer communicating via a base station with a user equipment over a partially wireless connection in accordance with some embodiments In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which may have storage and/or processing capabilities. In particular, processing circuitry 2818 may comprise one or more programmable processors, application-specific integrated circuits, field programmable gate arrays or combinations of these (not shown) adapted to execute instructions.

Host computer 2810 further comprises software 2811, which is stored in or accessible by host computer 2810 and executable by processing circuitry 2818. Software 2811 includes host application 2812. Host application 2812 may be operable to provide a service to a remote user, such as UE 2830 connecting via OTT connection 2850 terminating at UE 2830 and host computer 2810. In providing the service to the remote user, host application 2812 may provide user data which is transmitted using OTT connection 2850.

Communication system 2800 further includes base station 2820 provided in a telecommunication system and comprising hardware 2825 enabling it to communicate with host computer 2810 and with UE 2830. Hardware 2825 may include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 may be configured to facilitate connection 2860 to host computer 2810. Connection 2860 may be direct or it may pass through a core network (not shown in FIG. 28) of the telecommunication system and/or through one or more intermediate networks outside the telecommunication system. In the embodiment shown, hardware 2825 of base station 2820 further includes processing circuitry 2828, which may comprise one or more programmable processors, application-specific integrated circuits, field programmable gate arrays or combinations of these (not shown) adapted to execute instructions. Base station 2820 further has software 2821 stored internally or accessible via an external connection.

Communication system 2800 further includes UE 2830 already referred to. Its hardware 2835 may include radio interface 2837 configured to set up and maintain wireless connection 2870 with a base station serving a coverage area in which UE 2830 is currently located. Hardware 2835 of UE 2830 further includes processing circuitry 2838, which may comprise one or more programmable processors, application-specific integrated circuits, field programmable gate arrays or combinations of these (not shown) adapted to execute instructions. UE 2830 further comprises software 2831, which is stored in or accessible by UE 2830 and executable by processing circuitry 2838. Software 2831 includes client application 2832. Client application 2832 may be operable to provide a service to a human or non-human user via UE 2830, with the support of host computer 2810. In host computer 2810, an executing host application 2812 may communicate with the executing client application 2832 via OTT connection 2850 terminating at UE 2830 and host computer 2810. In providing the service to the user, client application 2832 may receive request data from host application 2812 and provide user data in response to the request data. OTT connection 2850 may transfer both the request data and the user data. Client application 2832 may interact with the user to generate the user data that it provides.

It is noted that host computer 2810, base station 2820 and UE 2830 illustrated in FIG. 28 may be similar or identical to host computer 2730, one of base stations 2712a, 2712b, 2712c and one of UEs 2791, 2792 of FIG. 27, respectively. This is to say, the inner workings of these entities may be as shown in FIG. 28 and independently, the surrounding network topology may be that of FIG. 27.

In FIG. 28, OTT connection 2850 has been drawn abstractly to illustrate the communication between host computer 2810 and UE 2830 via base station 2820, without explicit reference to any intermediary devices and the precise routing of messages via these devices. Network infrastructure may determine the routing, which it may be configured to hide from UE 2830 or from the service provider operating host computer 2810, or both. While OTT connection 2850 is active, the network infrastructure may further take decisions by which it dynamically changes the routing (e.g., on the basis of load balancing consideration or reconfiguration of the network).

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment.

A measurement procedure may be provided for the purpose of monitoring data rate, latency and other factors on which the one or more embodiments improve. There may further be an optional network functionality for reconfiguring OTT connection 2850 between host computer 2810 and UE 2830, in response to variations in the measurement results. The measurement procedure and/or the network functionality for reconfiguring OTT connection 2850 may be implemented in software 2811 and hardware 2815 of host computer 2810 or in software 2831 and hardware 2835 of UE 2830, or both. In embodiments, sensors (not shown) may be deployed in or in association with communication devices through which OTT connection 2850 passes; the sensors may participate in the measurement procedure by supplying values of the monitored quantities exemplified above, or supplying values of other physical quantities from which software 2811, 2831 may compute or estimate the monitored quantities. The reconfiguring of OTT connection 2850 may include message format, retransmission settings, preferred routing etc.; the reconfiguring need not affect base station 2820, and it may be unknown or imperceptible to base station 2820. Such procedures and functionalities may be known and practiced in the art. In certain embodiments, measurements may involve proprietary UE signaling facilitating host computer 2810's measurements of throughput, propagation times, latency and the like. The measurements may be implemented in that software 2811 and 2831 causes messages to be transmitted, in particular empty or 'dummy' messages, using OTT connection 2850 while it monitors propagation times, errors etc.

Figure 29:
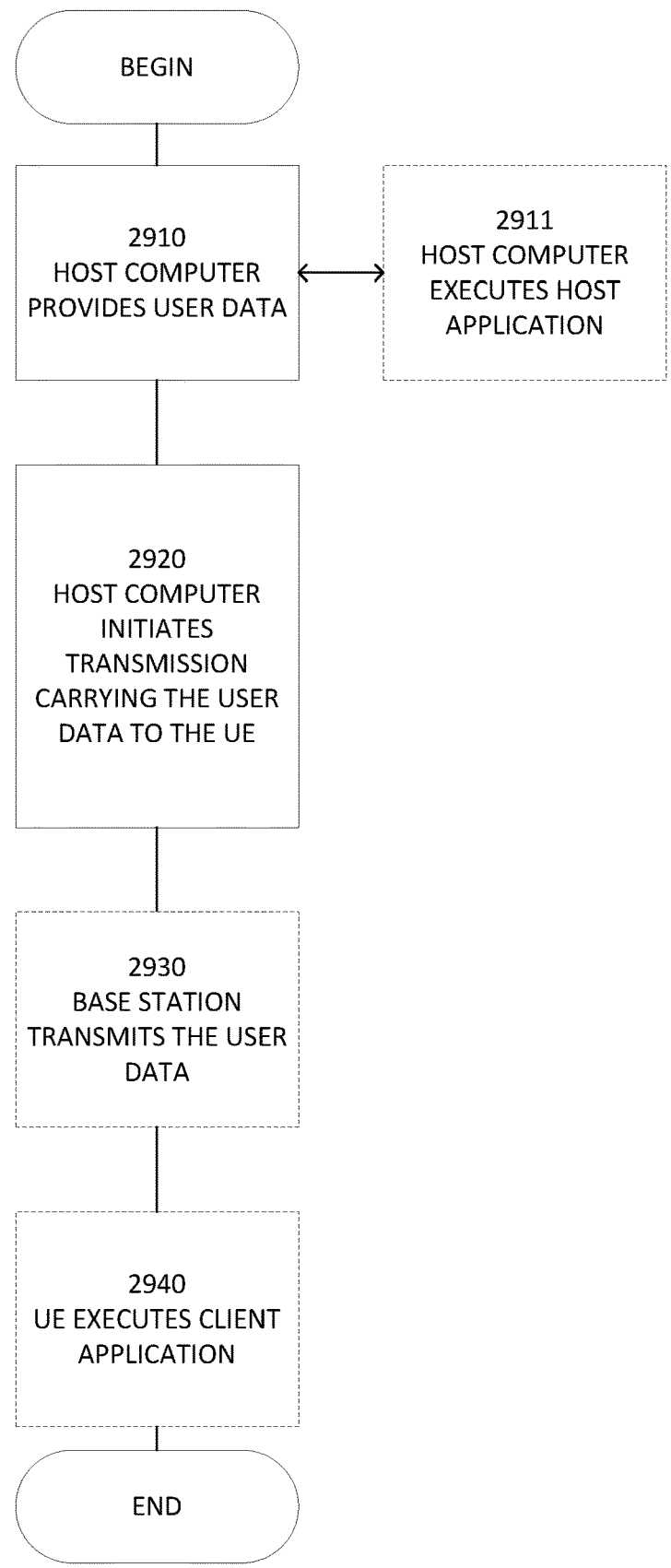
FIG. 29 is a flowchart illustrating a method implemented in a communication system, in accordance with one embodiment.

FIG. 29 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 29 will be included in this section. In step 2910, the host computer provides user data. In substep 2911 (which may be optional) of step 2910, the host computer provides the user data by executing a host application. In step 2920, the host computer initiates a transmission carrying the user data to the UE. In step 2930 (which may be optional), the base station transmits to the UE the user data which was carried in the transmission that the host computer initiated, in accordance with the teachings of the embodiments described throughout this disclosure. In step 2940 (which may also be optional), the UE executes a client application associated with the host application executed by the host computer.

Figure 30:
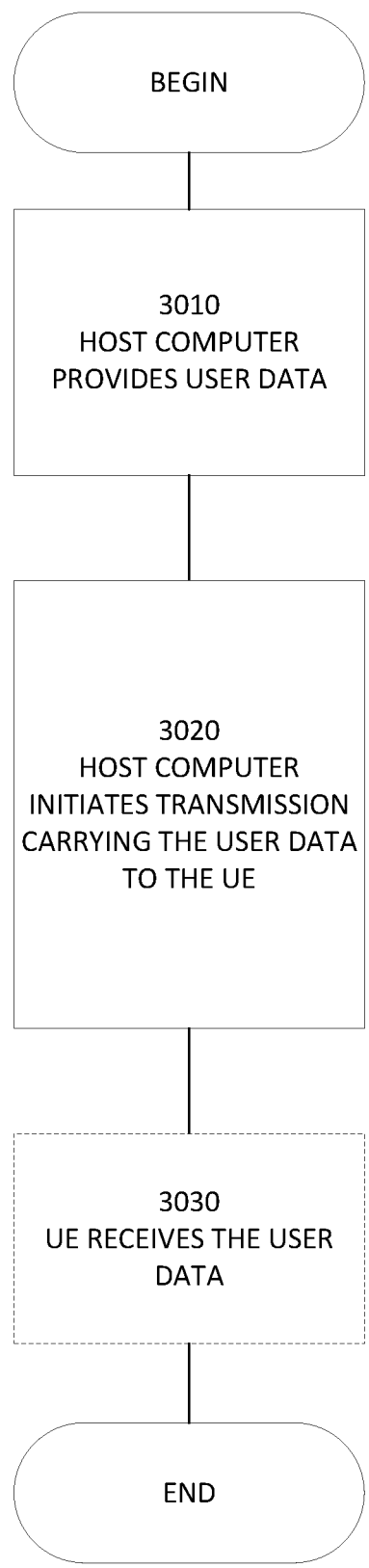
FIG. 30 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission may pass via the base station, in accordance with the teachings of the embodiments described throughout this disclosure. In step 3030 (which may be optional), the UE receives the user data carried in the transmission.

Figure 31:
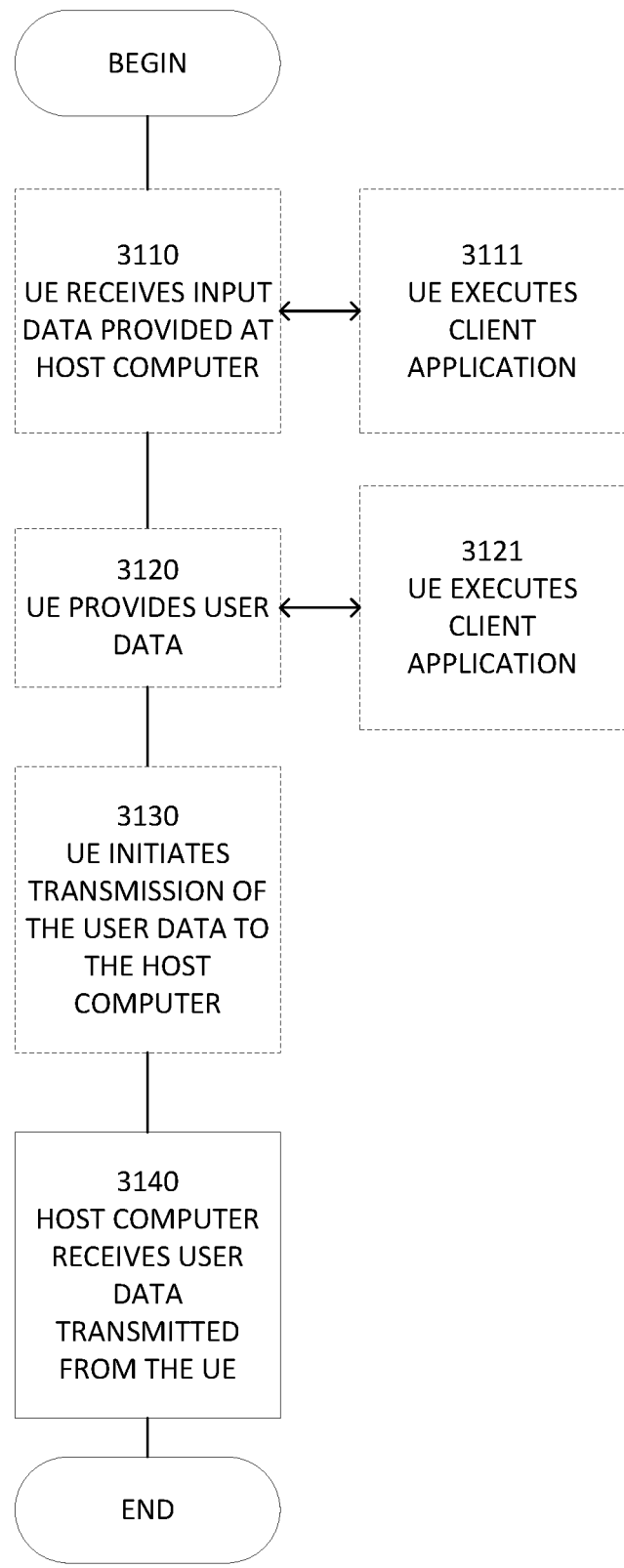
FIG. 31 is a flowchart illustrating a method implemented in a communication system, in accordance with one embodiment.

FIG. 31 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 31 will be included in this section. In step 3110 (which may be optional), the UE receives input data provided by the host computer. Additionally or alternatively, in step 3120, the UE provides user data. In substep 3121 (which may be optional) of step 3120, the UE provides the user data by executing a client application. In substep 3111 (which may be optional) of step 3110, the UE executes a client application which provides the user data in reaction to the received input data provided by the host computer. In providing the user data, the executed client application may further consider user input received from the user. Regardless of the specific manner in which the user data was provided, the UE initiates, in substep 3130 (which may be optional), transmission of the user data to the host computer. In step 3140 of the method, the host computer receives the user data transmitted from the UE, in accordance with the teachings of the embodiments described throughout this disclosure.

Figure 32:
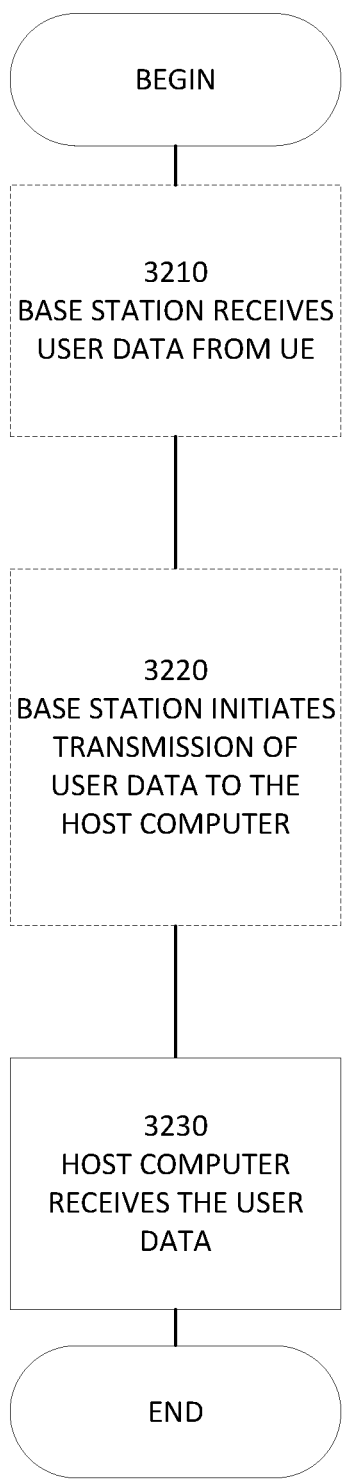
FIG. 32 is a flowchart illustrating a method implemented in a communication system, in accordance with one embodiment.

FIG. 32 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 32 will be included in this section. In step 3210 (which may be optional), in accordance with the teachings of the embodiments described throughout this disclosure, the base station receives user data from the UE. In step 3220 (which may be optional), the base station initiates transmission of the received user data to the host computer. In step 3230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

Group A Embodiments

A1. A method performed by a wireless device, the method comprising:
    receiving, over an access stratum, a capability enquiry that requests the wireless device to transmit capability information indicating one or more capabilities of the wireless device; and
    after receiving the capability enquiry:
        generating a token using one or more input parameters and transmitting the token, wherein the one or more input parameters include at least some part of the capability enquiry and/or at least some of the capability information, wherein the token is generated or transmitted based on a non-access stratum security context at the wireless device; and transmitting the capability information over the access stratum;

A2. The method of embodiment A1, wherein the token is generated based on a non-access stratum security context at the wireless device.

A3. The method of any of embodiments A1-A2, wherein the one or more input parameters include at least some information that is in or derived from the non-access stratum security context.

A4. The method of any of embodiments A1-A3, wherein the one or more input parameters include a key that is in or derived from the non-access stratum security context.

A5. The method of any of embodiments A1-A4, wherein the one or more input parameters include at least one of any one or more of:
 a count value included in the non-access stratum security context; and
 a freshness parameter.

A6. The method of any of embodiments A1-A5, wherein generating the token comprises generating the token based on an integrity algorithm or an encryption algorithm identified by the non-access stratum security context.

A7. The method of any of embodiments A1-A6, wherein generating the token comprises generating the token using a cryptographic hash function, a key derivation function, an integrity algorithm, or an encryption algorithm.

A8. The method of any of embodiments A1-A7, wherein generating the token comprises calculating the token as a hash, or as a keyed hash, over the at least some of the capability information.

A9. The method of any of embodiments A1-A8, wherein the one or more input parameters include at least some of the capability information.

A10. The method of any of embodiments A1-A9, wherein the one or more input parameters include at least some part of the capability enquiry.

A11. The method of any of embodiments A1-A10, wherein the capability enquiry is received over the access stratum without access stratum security and/or the capability information is transmitted over the access stratum without access stratum security.

A12. The method of any of embodiments A1-A11, wherein transmitting the capability information comprises transmitting a response to the capability enquiry, wherein the response includes the capability information and the token.

A13. The method of any of embodiments A1-A11, wherein transmitting the token comprises transmitting the token to radio network equipment over the access stratum.

A14. The method of any of embodiments A1-A11, wherein transmitting the token comprises transmitting the token to core network equipment in a non-access stratum message.

A15. The method of any of embodiments A1-A14, wherein the capability information comprises access stratum capability information or radio capability information.

A16. The method of any of embodiments A1-A14, wherein the capability information comprises non-access stratum capability information or security capability information.

A17. The method of any of embodiments A1-A16, wherein the wireless device lacks support for access stratum security.

A18. The method of any of embodiments A1-A17, wherein the wireless device only supports control plane cellular internet of things optimization functionality.

AA1. A method performed by a wireless device, the method comprising:
 receiving a request at a first protocol layer of the wireless device; and
 transmitting, from a second protocol layer of the wireless device, a response to the request.

AA2. The method of embodiment AA1, wherein the request is received at the first protocol layer without security on the first protocol layer.

AA3. The method of any of embodiments AA1-AA2, wherein the response is transmitted from the second protocol layer with security on the second protocol layer.

AA4. The method of any of embodiments AA1-AA3, wherein transmitting the response comprises transmitting the response after activating security on the second protocol layer.

AA5. The method of any of embodiments AA1-AA4, wherein transmitting the response comprises:
 generating a first protocol layer message;
 encapsulating the first protocol layer message in the response; and
 transmitting the response from the second protocol layer.

AA6. The method of any of embodiments AA1-AA6, wherein the wireless device lacks support for security at the first protocol layer.

AA7. The method of any of embodiments AA1-AA6, wherein the wireless device only supports control plane cellular internet of things optimization functionality.

AA8. The method of any of embodiments AA1-AA7, wherein the first protocol layer is, corresponds to, or is included in an access stratum.

AA9. The method of any of embodiments AA1-AA8, wherein the second protocol layer is, corresponds to, or is included in a non-access stratum.

AA10. The method of any of embodiments AA1-AA9, wherein the request is a capability enquiry that requests the wireless device to transmit capability information indicating one or more capabilities of the wireless device, and wherein the response includes the capability information.

AA11. The method of embodiment AA10, wherein the capability information is included directly in the response.

AA12. The method of any of embodiments AA10-AA11, wherein the capability information comprises access stratum capability information or radio capability information.

AA13. The method of any of embodiments AA10-AA11, wherein the capability information comprises non-access stratum capability information or security capability information.

AA. The method of any of the previous embodiments, further comprising:
 providing user data; and
 forwarding the user data to a host computer via the transmission to a base station.

Group B Embodiments

B1. A method performed by radio network equipment, the method comprising:
 transmitting to a wireless device, over an access stratum, a capability enquiry that requests the wireless device to transmit capability information indicating one or more capabilities of the wireless device;
 after transmitting the capability enquiry, receiving the capability information from the wireless device over the access stratum; and transmitting, to network equipment, at least some of the received capability information and/or at least some part of the capability enquiry.

B2. The method of embodiment B1, further comprising receiving, from the network equipment, a notification indicating whether the network equipment verifies the capability enquiry and/or the capability information as being securely communicated.

B3. The method of any of embodiments B1-B2, further comprising receiving, from the network equipment, a notification indicating whether, or that, a token generated by the network equipment matches or corresponds to a token generated by the wireless device.

B4. The method of embodiment B3, wherein the token generated by the network equipment is generated based on the at least some of the received capability information and/or the at least some part of the capability enquiry.

B5. The method of any of embodiments B3-B4, wherein the token generated by the network equipment and the token generated by the wireless device are each generated or transmitted based on a non-access stratum security context established between the wireless device and the network equipment.

B6. The method of any of embodiments B1-B5, wherein the capability information comprises access stratum capability information or radio capability information.

B7. The method of any of embodiments B1-B6, wherein the capability information comprises non-access stratum capability information or security capability information.

B8. The method of any of embodiments B1-B7, wherein the wireless device lacks support for access stratum security.

B9. The method of any of embodiments B1-B8, wherein the wireless device only supports control plane cellular internet of things optimization functionality.

B10. The method of any of embodiments B1-B9, further comprising, after transmitting the capability enquiry to the wireless device:
  receiving a token from the wireless device; and
  transmitting the received token to the network equipment.

BB1. A method performed by network equipment, the method comprising:
  receiving, from radio network equipment, at least some part of a capability enquiry that the radio network equipment has sent to a wireless device to request the wireless device to transmit capability information indicating one or more capabilities of the wireless device and/or at least some of the capability information that the radio network equipment has received from the wireless device in response to the capability enquiry;
  generating, by the network equipment, a token using one or more input parameters, wherein the one or more input parameters include the at least some part of the capability enquiry and/or the at least some of the capability information received from the radio network equipment; and
  performing, or assisting the radio network equipment with, verification of whether the token that the network equipment generated matches or corresponds to a token that the wireless device generated after the wireless device received the capability enquiry.

BB2. The method of embodiment BB1, further comprising, after the network equipment receives the capability information from the wireless device, receiving the token that the wireless device generated.

BB3. The method of embodiment BB2, wherein receiving the token that the wireless device generated comprises receiving, from the radio network equipment, the token that the wireless device generated.

BB4. The method of embodiment BB2, wherein receiving the token that the wireless device generated comprises receiving, from the wireless device, the token that the wireless device generated.

BB5. The method of embodiment BB4, wherein the token that the wireless device generated is received in a non-access stratum message.

BB6. The method of any of embodiments BB4-BB5, wherein the token that the wireless device generated is received over a non-access stratum after activation of security on the non-access stratum.

BB7. The method of any of embodiments BB1-BB6, wherein generating the token by the network equipment comprises generating the token by the network equipment based on a non-access stratum security context at the network equipment.

BB8. The method of embodiment BB7, wherein the one or more input parameters include at least some information that is in or derived from the non-access stratum security context.

BB9. The method of any of embodiments BB7-BB8, wherein the one or more input parameters include a key that is in or derived from the non-access stratum security context.

BB10. The method of any of embodiments BB7-BB9, wherein the one or more input parameters include at least one of any one or more of:
  a count value included in the non-access stratum security context; and
  a freshness parameter.

BB11. The method of any of embodiments BB7-BB10, wherein generating the token comprises generating the token based on an integrity algorithm or an encryption algorithm identified by the non-access stratum security context.

BB12. The method of any of embodiments BB1-BB11, wherein generating the token comprises generating the token using a cryptographic hash function, a key derivation function, an integrity algorithm, or an encryption algorithm.

BB13. The method of any of embodiments BB1-BB12, wherein generating the token comprises calculating the token as a hash, or as a keyed hash, over the at least some of the capability information.

BB14. The method of any of embodiments BB1-BB13, wherein the one or more input parameters include at least some of the capability information.

BB15. The method of any of embodiments BB1-BB14, wherein the one or more input parameters include at least some part of the capability enquiry.

BB16. The method of any of embodiments BB1-BB15, wherein the capability enquiry is communicated over the access stratum without access stratum security and/or the capability information is communicated over the access stratum without access stratum security.

BB17. The method of any of embodiments BB1-BB16, wherein the capability information comprises access stratum capability information or radio capability information.

BB18. The method of any of embodiments BB1-BB16, wherein the capability information comprises non-access stratum capability information or security capability information.

BB19. The method of any of embodiments BB1-BB18, wherein the wireless device lacks support for access stratum security.

BB20. The method of any of embodiments BB1-BB19, wherein the wireless device only supports control plane cellular internet of things optimization functionality.

BB21. The method of any of embodiments BB1-BB20, comprising performing the verification.
BB22. The method of embodiment BB21, further comprising, after performing the verification, transmitting to the radio network equipment a notification based on the verification.
BB23. The method of any of embodiments BB1-BB20, comprising assisting the radio network equipment with the verification.
BB24. The method of any of embodiments BB1-BB23, wherein said assisting comprises transmitting the token generated by the network equipment to the radio network equipment.
BBB1. A method performed by radio network equipment, the method comprising:
    transmitting a request to a wireless device; and
    receiving, from network equipment, a response from the wireless device to the request.
BBB2. The method of embodiment BBB1, wherein the request is transmitted from a first protocol layer of the radio network equipment without security on the first protocol layer.
BBB3. The method of any of embodiments BBB1-BBB2, wherein the response is received from the network equipment on a protected interface with the network equipment.
BBB4. The method of any of embodiments BBB1-BBB3, wherein the request is transmitted on an access stratum.
BBB5. The method of any of embodiments BBB1-BBB4, wherein the response is received on an NB control plane interface.
BBB6. The method of any of embodiments BBB1-BBB5, wherein the wireless device lacks support for security on an access stratum.
BBB7. The method of any of embodiments BBB1-BBB6, wherein the wireless device only supports control plane cellular internet of things optimization functionality.
BBB8. The method of any of embodiments BBB1-BBB7, wherein the request is a capability enquiry that requests the wireless device to transmit capability information indicating one or more capabilities of the wireless device, and wherein the response includes the capability information.
BBB9. The method of embodiment BBB8, wherein the capability information is included directly in the response.
BBB10. The method of any of embodiments BBB8-BBB9, wherein the capability information comprises access stratum capability information or radio capability information.
BBB11. The method of any of embodiments BBB9-BBB10, wherein the capability information comprises non-access stratum capability information or security capability information.
BBB12. The method of any of embodiments BBB1-BBB11, wherein the radio network equipment initiates the request.
BBBB1. A method performed by a network equipment, the method comprising:
    receiving, from a wireless device, a response to a request that a radio network equipment transmitted to the wireless device; and
    transmitting the response to the radio network equipment.
BBBB2. The method of embodiment BBBB1, wherein the request is transmitted from a first protocol layer of the radio network equipment to the wireless device without security on the first protocol layer.
BBBB3. The method of any of embodiments BBBB1-BBBB2, wherein the response is transmitted from the network equipment on a protected interface with the radio network equipment.
BBBB4. The method of any of embodiments BBBB1-BBBB3, wherein the request is transmitted from the radio network equipment to the wireless device on an access stratum.
BBBB5. The method of any of embodiments BBBB1-BBBB4, wherein the response is transmitted to the radio network equipment on an NB control plane interface.
BBBB6. The method of any of embodiments BBBB1-BBBB5, wherein the wireless device lacks support for security on an access stratum.
BBBB7. The method of any of embodiments BBBB1-BBBB6, wherein the wireless device only supports control plane cellular internet of things optimization functionality.
BBBB8. The method of any of embodiments BBBB1-BBBB7, wherein the request is a capability enquiry that requests the wireless device to transmit capability information indicating one or more capabilities of the wireless device, and wherein the response includes the capability information.
BBBB9. The method of embodiment BBBB8, wherein the capability information is included directly in the response.
BBBB10. The method of any of embodiments BBBB8-BBBB9, wherein the capability information comprises access stratum capability information or radio capability information.
BBBB11. The method of any of embodiments BBBB9-BBBB10, wherein the capability information comprises non-access stratum capability information or security capability information.
BBBB12. The method of any of embodiments BBBB1-BBBB11, wherein the radio network equipment initiates the request.
BB. The method of any of the previous embodiments, further comprising:
    obtaining user data; and
    forwarding the user data to a host computer or a wireless device.

Group C Embodiments

C1. A wireless device configured to perform any of the steps of any of the Group A embodiments.
C2. A wireless device comprising processing circuitry configured to perform any of the steps of any of the Group A embodiments.
C3. A wireless device comprising:
    communication circuitry; and
    processing circuitry configured to perform any of the steps of any of the Group A embodiments.
C4. A wireless device comprising:
    processing circuitry configured to perform any of the steps of any of the Group A embodiments; and
    power supply circuitry configured to supply power to the wireless device.
C5. A wireless device comprising:
    processing circuitry and memory, the memory containing instructions executable by the processing circuitry whereby the wireless device is configured to perform any of the steps of any of the Group A embodiments.
C6. A user equipment (UE) comprising:
    an antenna configured to send and receive wireless signals;
    radio front-end circuitry connected to the antenna and to processing circuitry, and configured to condition signals communicated between the antenna and the processing circuitry;

the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. Network equipment configured to perform any of the steps of any of the Group B embodiments.

C10. Network equipment comprising processing circuitry configured to perform any of the steps of any of the Group B embodiments.

C11. Network equipment comprising:
communication circuitry; and
processing circuitry configured to perform any of the steps of any of the Group B embodiments.

C12. Network equipment comprising:
processing circuitry configured to perform any of the steps of any of the Group B embodiments;
power supply circuitry configured to supply power to the network equipment.

C13. Network equipment comprising:
processing circuitry and memory, the memory containing instructions executable by the processing circuitry whereby the network equipment is configured to perform any of the steps of any of the Group B embodiments.

C14. The network equipment of any of embodiments C9-C13, wherein the network equipment is a base station.

C15. A computer program comprising instructions which, when executed by at least one processor of network equipment, causes the network equipment to carry out the steps of any of the Group B embodiments.

C16. The computer program of embodiment C14, wherein the network equipment is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;
the UE is configured to execute a client application associated with the host application, thereby providing the user data to be received by the host computer.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method performed by a wireless device, the method comprising:
receiving, over an access stratum, a capability enquiry that requests the wireless device to transmit capability information indicating one or more capabilities of the wireless device, the capability enquiry being received over the access stratum and not having access stratum security, the capabilities of the wireless device being access stratum capabilities; and
after receiving the capability enquiry:
generating a token using one or more input parameters and transmitting the token, the one or more input parameters including at least some part of the capability enquiry and some of the capability information that the wireless device has or will transmit, the token being generated or transmitted based on a non-access stratum security context at the wireless device; and
transmitting the capability information over the access stratum without having activated security over the access stratum, without having activated security over the access stratum comprising without the use of a security key for activating or applying integrity protection and without confidentiality protection over the access stratum.

2. The method of claim 1, wherein the one or more input parameters include:
at least some part of the capability enquiry; or
at least some of the capability information.

3. The method of claim 1, wherein the one or more input parameters include one or both of:
a key that is in or derived from the non-access stratum security context; and
a count value included in the non-access stratum security context.

4. The method of claim 1, wherein generating the token comprises calculating the token as a hash, or as a keyed hash, over the at least some of the capability information.

5. The method of claim 1, wherein transmitting the capability information comprises transmitting a response to the capability enquiry, wherein the response includes the capability information and the token.

6. The method of claim 1, wherein transmitting the token comprises:
transmitting the token to radio network equipment over the access stratum; or transmitting the token to core network equipment in a non-access stratum message.

7. A method performed by network equipment, the method comprising:

receiving, from radio network equipment, at least some part of a capability enquiry that the radio network equipment has sent to a wireless device to request the wireless device to transmit capability information indicating one or more capabilities of the wireless device, the request being transmitted from a first protocol layer of the radio network equipment to the wireless device without security on the first protocol layer, the wireless device transmitting the capability information over an access stratum without having activated security over the access stratum, without having activated security over the access stratum comprising without the use of a security key for activating or applying integrity protection and without confidentiality protection over the access stratum, the capabilities of the wireless device being access stratum capabilities, and at least some of the capability information that the radio network equipment has received from the wireless device in response to the capability enquiry;

generating, by the network equipment, a token using one or more input parameters, the one or more input parameters including the at least some part of the capability enquiry and the at least some of the capability information that the wireless device has or will transmit and that is received from the radio network equipment; and performing, or assisting the radio network equipment with, verification of whether the token that the network equipment generated matches or corresponds to a token that the wireless device generated.

8. The method of claim 7, further comprising, after the network equipment receives the capability information from the wireless device, receiving the token that the wireless device generated.

9. The method of claim 8, wherein receiving the token that the wireless device generated comprises:

receiving, from the radio network equipment, the token that the wireless device generated; or receiving, from the wireless device, the token that the wireless device generated.

10. The method of claim 7, wherein generating the token by the network equipment comprises generating the token by the network equipment based on a non-access stratum security context at the network equipment.

11. The method of claim 7, wherein generating the token comprises calculating the token as a hash, or as a keyed hash, over the at least some of the capability information.

12. A wireless device comprising:

communication circuitry; and processing circuitry configured to:

receive, over an access stratum, a capability enquiry that requests the wireless device to transmit capability information indicating one or more capabilities of the wireless device, the capability enquiry being received over the access stratum and not having access stratum security, the capabilities of the wireless device being access stratum capabilities; and after receiving the capability enquiry:

generate a token using one or more input parameters and transmit the token, the one or more input parameters including at least some part of the capability enquiry and at least some of the capability information that the wireless device has or will transmit, the token being generated or transmitted based on a non-access stratum security context at the wireless device; and transmit the capability information over the access stratum without having activated security over the access stratum, without having activated security over the access stratum comprising without the use of a security key for activating or applying integrity protection and without confidentiality protection over the access stratum.

\* \* \* \* \*